US012694801B2

(12) United States Patent (10) Patent No.: US 12,694,801 B2
Yamanaka et al. (45) Date of Patent: Jul. 28, 2026

(54) VASCULAR LESION MODEL

(71) Applicant: ASAHI INTECC CO., LTD., Seto (JP)

(72) Inventors: Nobuyoshi Yamanaka, Seto (JP); Rina Yoneyama, Seto (JP); Kazu Takemura, Seto (JP); Ryunosuke Tanemoto, Seto (JP); Asuka Sekishita, Seto (JP)

(73) Assignee: ASAHI INTECC CO., LTD., Seto (JP)

( * ) Notice: Subject to any disclaimer, the term of this patent is extended or adjusted under 35 U.S.C. 154(b) by 387 days.

(21) Appl. No.: 18/229,302

(22) Filed: Aug. 2, 2023

(65) Prior Publication Data

US 2023/0410688 A1 Dec. 21, 2023

Related U.S. Application Data

(63) Continuation of application No. PCT/JP2021/004601, filed on Feb. 8, 2021.

(51) Int. Cl.
G09B 23/30 (2006.01)
(52) U.S. Cl.
CPC .................................... G09B 23/30 (2013.01)
(58) Field of Classification Search
CPC ....... G09B 23/28; G09B 23/30; G09B 23/303
See application file for complete search history.

(56) References Cited

U.S. PATENT DOCUMENTS

| | | | |
|---|---|---|---|
| 6,517,354 B1 | 2/2003 | Levy | |
| 8,636,520 B2 * | 1/2014 | Iwasaki | G09B 23/288 |
| | | | 434/272 |

| | | | |
|---|---|---|---|
| 10,950,143 B2 * | 3/2021 | Niimi | G09B 23/285 |
| 11,263,923 B2 * | 3/2022 | Kumar | G09B 23/285 |
| 11,908,342 B2 * | 2/2024 | Namima | G09B 23/32 |
| 2008/0076101 A1 * | 3/2008 | Hyde | G09B 23/30 |
| | | | 156/61 |
| 2011/0117531 A1 | 5/2011 | Iwasaki et al. | |
| 2012/0028231 A1 * | 2/2012 | Misawa | G09B 23/285 |
| | | | 434/267 |

FOREIGN PATENT DOCUMENTS

| | | | |
|---|---|---|---|
| CN | 107492295 A | | 12/2017 |
| CN | 111564093 A | | 8/2020 |
| JP | 2010224069 A | * | 10/2010 |
| JP | 2011-27794 A | | 2/2011 |
| JP | 2012189909 A | * | 10/2012 |
| WO | 2010/007801 A1 | | 1/2010 |
| WO | 2020/250338 A1 | | 12/2020 |

* cited by examiner

*Primary Examiner* — Kurt Fernstrom
(74) *Attorney, Agent, or Firm* — Oliff PLC

(57) ABSTRACT

A vascular lesion model including a blood vessel portion and a lesion portion divided into a plurality of lesion regions having different hardness. The lesion portion including at least one type of lesion region among a first lesion region contacting a part of an inner periphery of the blood vessel portion in a cross section perpendicular to a longitudinal direction and having a shape extending from the part of the inner periphery toward a center of the lesion portion, a second lesion region having a solid shape separated from an outer periphery of the lesion portion, a third lesion region separated from both ends of the lesion portion in the longitudinal direction and occluding the blood vessel portion, and a plurality of fourth lesion regions separated from the inner periphery of the blood vessel portion in a cross section perpendicular to the longitudinal direction, and arranged separately from one another.

16 Claims, 32 Drawing Sheets

VASCULAR LESION MODEL

CROSS REFERENCE TO RELATED APPLICATIONS

This application is a continuation application of International Application No. PCT/JP2021/004601, filed Feb. 8, 2021. The contents of this application are incorporated herein by reference in their entirety.

TECHNICAL FIELD

This application relates to a vascular lesion model.

BACKGROUND

Conventionally, various vascular lesion models are known. Such vascular lesion models are used in the training of procedures for treating vascular stenosis and occlusion of blood vessels by using medical devices such as catheters and guide wires, for example, in percutaneous transluminal angioplasty (PTA). For example, in Patent Literature 1, as an example of such a vascular lesion model, there is disclosed a living body model for training in which a pseudo-lesion member having a shape that constricts or occludes a lumen portion to simulate a lesion portion is arranged in the lumen portion of a tubular pseudo-tissue.

CITATION LIST

Patent Literature

Patent Literature 1: JP 2011-27794 A

SUMMARY

Technical Problem

However, conventionally known vascular lesion models do not provide sufficient variations in physical properties and structures of lesion portions. For example, the living body model described in Patent Literature 1 mentioned above includes, as the pseudo-lesion member, a single-layer member formed of a polymer material. On the other hand, lesion portions formed in actual blood vessels generally have various configurations. Therefore, a vascular lesion model corresponding to various clinical cases is desired for applications targeting training of various types of treatment using medical devices, development of medical devices, and the like.

Solution to Problem

The present disclosure can be realized in the following aspects.

(1) According to one aspect of the present disclosure, a vascular lesion model is provided. The vascular lesion model includes a blood vessel portion having a hollow shape and simulating a blood vessel, and a lesion portion arranged inside the blood vessel portion and divided into a plurality of lesion regions having different hardness, at least a part of lesion regions among the plurality of lesion regions being formed by using a polymer material, in which the lesion portion includes, as the at least a part of the lesion regions, at least one type of lesion region among a first lesion region arranged to contact a part of an inner periphery of the blood vessel portion in a cross section perpendicular to a longitudinal direction of the vascular lesion model and having a shape that extends from the part of the inner periphery toward a center of the lesion portion, a second lesion region having a solid shape separated from an outer periphery of the lesion portion in both a cross section perpendicular to the longitudinal direction and a cross section parallel to the longitudinal direction, a third lesion region arranged separated from both ends of the lesion portion in the longitudinal direction and provided to occlude the blood vessel portion, and a plurality of fourth lesion regions provided separated from the inner periphery of the blood vessel portion in a cross section perpendicular to the longitudinal direction, and arranged independently and separately from one another.

According to the vascular lesion model of this aspect, the lesion portion includes at least one type of lesion region among the first lesion region to the fourth lesion region, and thus, it is possible to provide variations of vascular lesion models different from conventional vascular lesion models, as vascular lesion models corresponding to various clinical cases.

(2) In the vascular lesion model of the aspect described above, the lesion portion may include the first lesion region, and the first lesion region may be formed harder than the lesion region contacting the first lesion region. According to such a configuration, the first lesion region having a shape that extends from a part of the inner periphery of the blood vessel portion toward the center of the lesion portion is formed hard, so that it is possible to use the first lesion region to simulate a lesion region that is harder than other sections, such as a calcified lesion.

(3) In the vascular lesion model of the aspect described above, in a cross section perpendicular to the longitudinal direction, the lesion portion may be divided into a plurality of the lesion regions including the first lesion region, by a plurality of lines connecting two points on the inner periphery of the blood vessel portion and not intersecting one another. According to such a configuration, a lesion portion including the first lesion region can be easily realized.

(4) In the vascular lesion model of the aspect described above, the lesion portion may include the second lesion region, and the second lesion region may be formed to have different hardness in a section including a surface of the second lesion region and another section of the second lesion region. According to such a configuration, it is possible to enhance the effect of providing, as vascular lesion models corresponding to various clinical cases, variations of vascular lesion models that are different from conventional models.

(5) In the vascular lesion model of the aspect described above, the lesion portion may include the third lesion region, and the third lesion region may be formed harder than a lesion region arranged adjacent to the third lesion region in the lesion portion. According to such a configuration, the third lesion region arranged separated from both ends of the lesion portion in the longitudinal direction and occluding the blood vessel portion, is formed hard, so that it is possible to use the third lesion region to simulate a lesion region that is harder than other sections, such as a calcified lesion.

(6) In the vascular lesion model of the aspect described above, the lesion portion may include the plurality of fourth lesion regions, and a part of the plurality of fourth lesion regions may be formed harder than another part of the fourth lesion regions. According to such a configuration, it is possible to enhance the effect of providing, as vascular lesion models corresponding to various clinical cases, variations of vascular lesion models that are different from conventional models.

(7) In the vascular lesion model of the aspect described above, at least a part of lesion regions among the plurality of lesion regions may include an inorganic material. According to such a configuration, by providing the inorganic material, it is easy to form a lesion region that is harder than another lesion region.

(8) In the vascular lesion model of the aspect described above, a part of the plurality of lesion regions in the lesion portion may include a porous polymer body. According to such a configuration, a material forming a lesion region adjacent to the lesion region including the porous polymer body can penetrate into pores of the porous polymer body, and thus, it is possible to increase the adhesion between the lesion region including the porous polymer body and the lesion region adjacent thereto.

(9) In the vascular lesion model of the aspect described above, the lesion portion may include a plurality of through-holes penetrating the lesion portion in the longitudinal direction. According to such a configuration, the plurality of through-holes can be used to simulate a true lumen and a false lumen in a blood vessel, so that it is possible to enhance the effect of providing, as vascular lesion models corresponding to various clinical cases, variations of vascular lesion models that are different from conventional models.

(10) The vascular lesion model of the aspect described above may further include a member imitating an intravascular indwelling device that is indwelled and used in a blood vessel in the lesion portion. According to such a configuration, it is possible to simulate a vascular lesion including a lesion portion where restenosis or reocclusion occurs after a treatment for indwelling an intravascular indwelling device.

The present disclosure can be realized in various aspects other than the ones described above. For example, the present disclosure can be realized in aspects such as a method of manufacturing a vascular lesion model, an organ model including a vascular lesion model, and a human body simulation apparatus including a vascular lesion model.

DETAILED DESCRIPTION

A. First Embodiment

Figure 1:
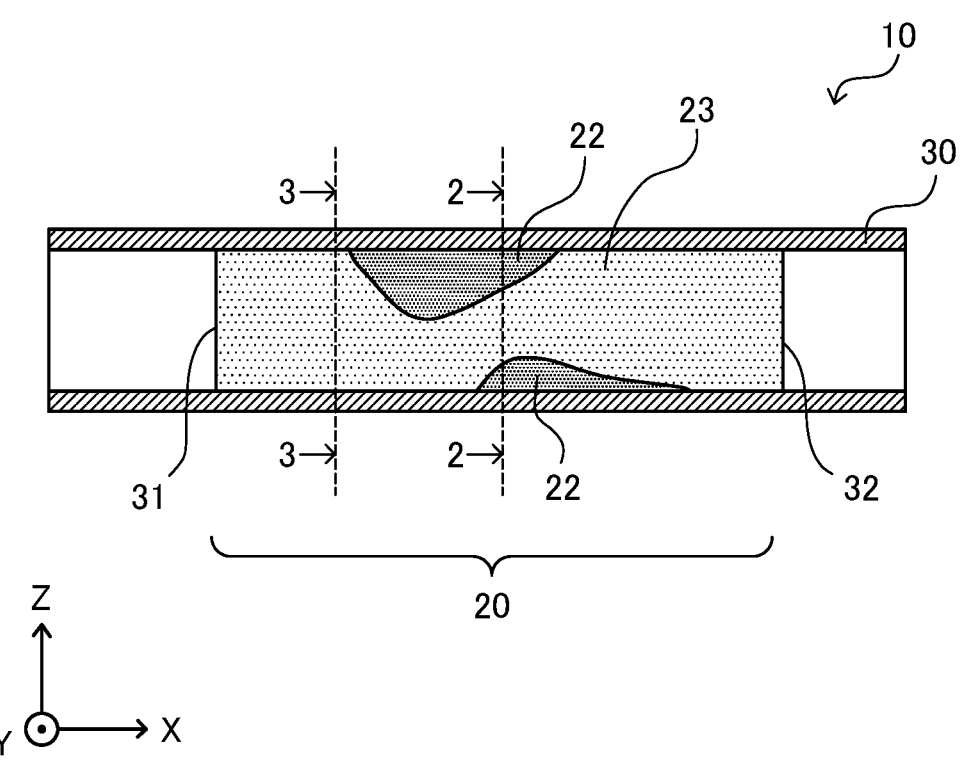
FIG. 1 is a cross-sectional view schematically illustrating an overall configuration of a vascular lesion model according to a first embodiment.

FIG. 1 is a cross-sectional view schematically illustrating an overall configuration of a vascular lesion model 10 according to a first embodiment. The vascular lesion model 10 of the present embodiment is used for purposes such as training of various procedures for treatment employing medical devices such as a catheter and a guide wire, and development of medical devices. The vascular lesion model 10 is formed in a substantially columnar shape as a whole. The vascular lesion model 10 includes a lesion portion 20 that simulates a lesion formed in a blood vessel, and a blood vessel portion 30 in which the lesion portion 20 is arranged. FIG. 1 illustrates an X-axis, a Y-axis, and a Z-axis that are orthogonal to one another. The X-axis corresponds to a longitudinal direction of the vascular lesion model 10 (hereinafter also simply referred to as the longitudinal direction), the Y-axis corresponds to a height direction of the vascular lesion model 10, and the Z-axis corresponds to a width direction of the vascular lesion model 10. Directions indicated by the axes described above are common to the directions indicated by the X-axis, the Y-axis, and the Z-axis in each drawing described later. FIG. 1 is a cross section parallel to the longitudinal direction of the vascular lesion model 10 and illustrates a state of a cross section passing through a central axis extending in the longitudinal direction of the vascular lesion model 10.

Figure 2:
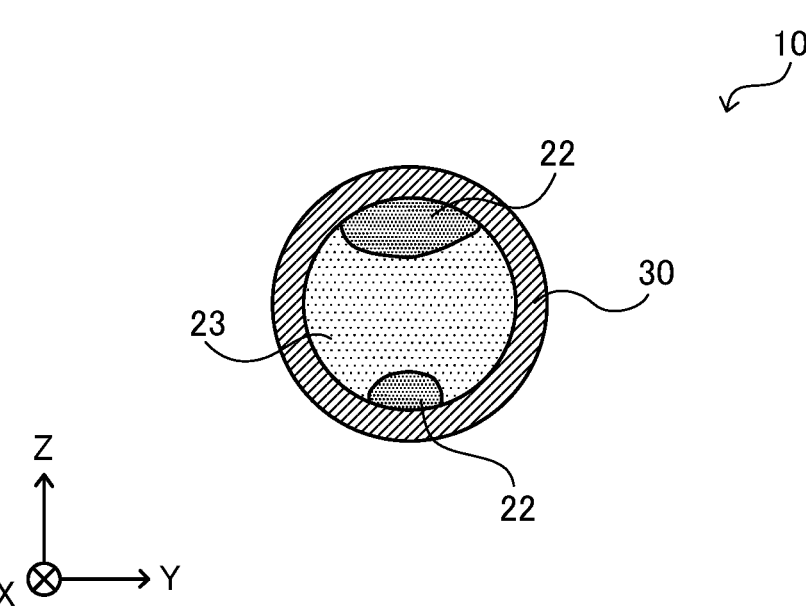
FIG. 2 is a cross-sectional view schematically illustrating a state of a cross section perpendicular to a longitudinal direction of the vascular lesion model.
Figure 3:
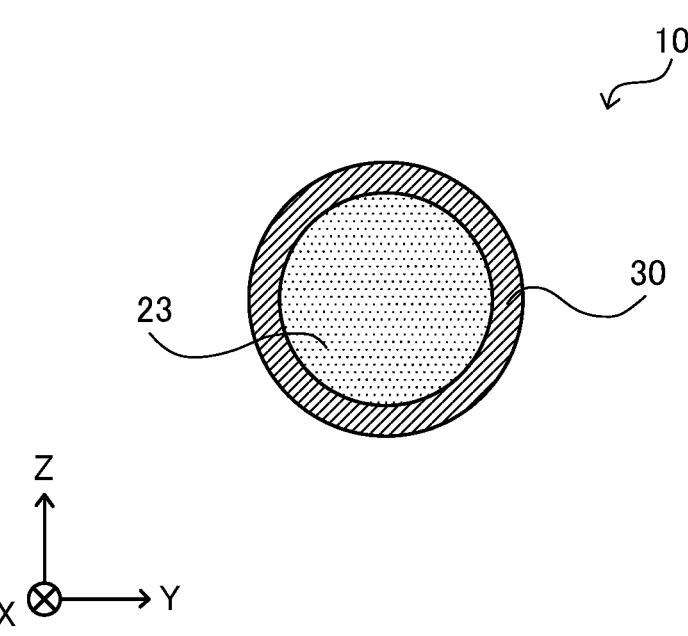
FIG. 3 is a cross-sectional view schematically illustrating a state of a cross section perpendicular to the longitudinal direction of the vascular lesion model.

FIGS. 2 and 3 are cross-sectional views schematically illustrating a state of cross sections perpendicular to the longitudinal direction of the vascular lesion model 10. In FIG. 1, a position of the cross section of FIG. 2 is illustrated as a cross section 2-2, and a position of the cross section of FIG. 3 is illustrated as a cross section 3-3. As illustrated in FIGS. 1 to 3, the lesion portion 20 is divided into two protruding lesion regions 22 and an interposed lesion region 23 that is a region other than the protruding lesion regions 22. There may be one protruding lesion region 22, or a plurality of protruding lesion regions 22 such as three or more. As illustrated in FIGS. 1 to 3, in the present embodiment, the lesion portion 20 occludes the inside of the blood vessel portion 30, but the lesion portion 20 may constrict the blood vessel portion 30 without completely occluding the blood vessel portion 30.

As illustrated in FIG. 2, in a cross section perpendicular to the longitudinal direction of the vascular lesion model 10, the protruding lesion regions 22 are arranged to contact a part of an inner periphery of the blood vessel portion 30 and each have a shape that extends from the part of the inner periphery of the blood vessel portion 30 toward a center of the lesion portion 20. As illustrated in FIG. 1, the protruding lesion regions 22 are arranged separated from both ends of the lesion portion 20 in the longitudinal direction. The protruding lesion regions 22 are also called "first lesion regions". The interposed lesion region 23 is a region other than the protruding lesion regions 22 in the lesion portion 20.

Both the protruding lesion regions 22 and the interposed lesion region 23 of the present embodiment are formed by using a polymer material. Examples of the polymer material used to form the protruding lesion regions 22 and the interposed lesion region 23 include, but are not limited to, thermoplastic resins such as nylon, polyamide, polycarbonate, polyethylene terephthalate (PET), polystyrene, acrylic resins, polyvinyl chloride, and polyvinyl alcohol (PVA). Further examples of the polymer material include thermosetting resins such as polyurethane, silicone resin, and fluororesin. In addition, water-absorbing resins such as acrylamide and sodium acrylate can be used as the polymer material. Further examples include polysaccharide hydrogels such as agarose, carrageenan, methylcellulose gel, hyaluronic acid hydrogel, sodium alginate, carboxymethyl cellulose gel, and xanthan gum, other polysaccharides such as glycogen, cellulose, and starch, and protein hydrogels such as collagen, gelatin, albumin, and keratin. Moreover, latex-derived natural rubber, polybutadiene-based or nitrile-based synthetic rubber, and the like can be used as the polymer material. Among the polymer materials mentioned above, polysaccharide hydrogels and polyvinyl alcohol may be desirable, because these materials are easy to handle. In particular, agarose is desirable, because the softness of agarose can be easily adjusted. If polyvinyl alcohol is used, it is easier to further soften the gel that forms the lesion region, compared to a case where agarose is used.

The material forming the protruding lesion regions 22 and the interposed lesion region 23 can be freely selected from various polymer materials such as the materials mentioned above. Moreover, the protruding lesion regions 22 and the interposed lesion region 23 may each be formed by combining a plurality of freely selected polymer materials among various polymer materials such as the materials mentioned above. The polymer materials forming the protruding lesion regions 22 and the interposed lesion region 23 may be materials of the same type or of different types.

In the present embodiment, the protruding lesion regions 22 and the interposed lesion region 23 have different hardness. If the protruding lesion regions 22 and the interposed lesion region 23 are formed by using polymer materials of the same type, the hardness of each lesion region can be easily varied by providing the polymer material in different concentrations. In FIGS. 1 to 3, a darker hatching of a lesion region indicates that the lesion region is harder. That is, in the present embodiment, the two protruding lesion regions 22 are formed with the same hardness, and the interposed lesion region 23 is formed softer than the protruding lesion regions 22. However, the combination of hardness in the lesion regions may be different from the one described above. For example, the hardness of the two protruding lesion regions 22 may be different from each other, or the interposed lesion region 23 may be harder than the protruding lesion regions 22.

At least a part of the two protruding lesion regions 22 and the interposed lesion region 23 described above may further contain an inorganic material in addition to the polymer material. Examples of the inorganic material contained in a lesion region include, but are not limited to, calcium sulfate (as a hemihydrate, dihydrate, or anhydride), which is a hydratable compound, and cellulose nanofibers (CN). If such an inorganic material is contained in the lesion region in addition to the polymer material, it is possible to further increase the hardness of the lesion region. For example, it is only required to disperse the inorganic material in the polymer material in the form of a powder or as fine particles. Alternatively, the content of the inorganic material may be higher than the content of the polymer material in at least one of the protruding lesion regions 22. In this case, for example, the inorganic material in the form of a powder is mixed with a gel material that can be used as a solvent, such as agarose gel, gelatin gel, polyvinyl alcohol (PVA) gel, urethane gel, and silicone gel, and the mixture is molded into a desired shape to form the protruding lesion region 22.

It is possible to change the hardness of the lesion regions by adjusting at least one of the type of the polymer material, the concentration of the polymer material, the type of another material such as an inorganic material added to the polymer material, the mixing ratio of the other material, the particle size of the other material, and the like in the materials forming each of the lesion regions. For example, even when the type and the concentration of the polymer material are the same in different lesion regions, if at least one of the type, the mixing ratio, and the particle size of the other material dispersed in the polymer material is changed to obtain a different tactile sensation when inserting the medical device into the vascular lesion model 10, the hardness of these lesion regions is assumed to be different. The hardness of the lesion regions can be compared by the elastic modulus. The elastic modulus of each lesion region may be appropriately set within a range from greater than 0.001 MPa to less than 10 GPa, for example.

Further, at least one lesion region among the plurality of lesion regions forming the lesion portion 20, for example, at least one lesion region among the two protruding lesion regions 22, may be formed by using a porous body formed of a polymer material. For example, the porous polymer body can be obtained by a foaming method as follows. A foaming agent is mixed with one or two or more of the above-described polymer materials for forming the protruding lesion regions 22 and the interposed lesion region 23, and then, the polymer material is cured and molded to form the polymer material into a porous polymer material. Further, the porous polymer body can be obtained by mixing the above-described polymer material with a pore-forming agent, curing and molding the polymer material, and then, extracting (eluting) the pore-forming agent from the obtained molded body by an extraction method to form a porous polymer body. Moreover, the porous polymer body can be obtained by mixing the above-described polymer material with a foaming agent such as a surfactant, mechanically stirring the mixture to foam the polymer material, and then, curing and molding the polymer material.

The blood vessel portion 30 is a portion imitating a human blood vessel and has a hollow tubular shape. The blood vessel portion 30 is desirably formed of a transparent or translucent material so that the protruding lesion regions 22 and the interposed lesion region 23 arranged inside the blood vessel portion 30 can be visually recognized from the outside. Further, the blood vessel portion 30 is desirably formed of a resin material by which it is easy to obtain a tactile sensation similar to that of a human blood vessel when being touched via a medical device such as a catheter or a guide wire. Examples of materials that can be used to form the blood vessel portion 30 include, but are not limited to, polyvinyl alcohol (PVA), agarose, sodium alginate, cellulose, starch, glycogen, silicone, latex, and polyurethane. Among these materials, polyvinyl alcohol (PVA) may be desirable, because the slidability and the elasticity of PVA are similar to those of a human blood vessel. If the softness, the slidability, the elasticity, and the like of the blood vessel portion 30 are designed similar to those of a human blood vessel, it is possible to enhance the immersive feeling of an operator who trains a procedure related to treatment and diagnosis using the vascular lesion model 10. The inner diameter and the outer diameter of the blood vessel portion 30 and the length of the blood vessel portion 30 in the longitudinal direction can be freely selected according to the type of blood vessel to be simulated, the type of procedure to be trained, and the like.

Figure 4:
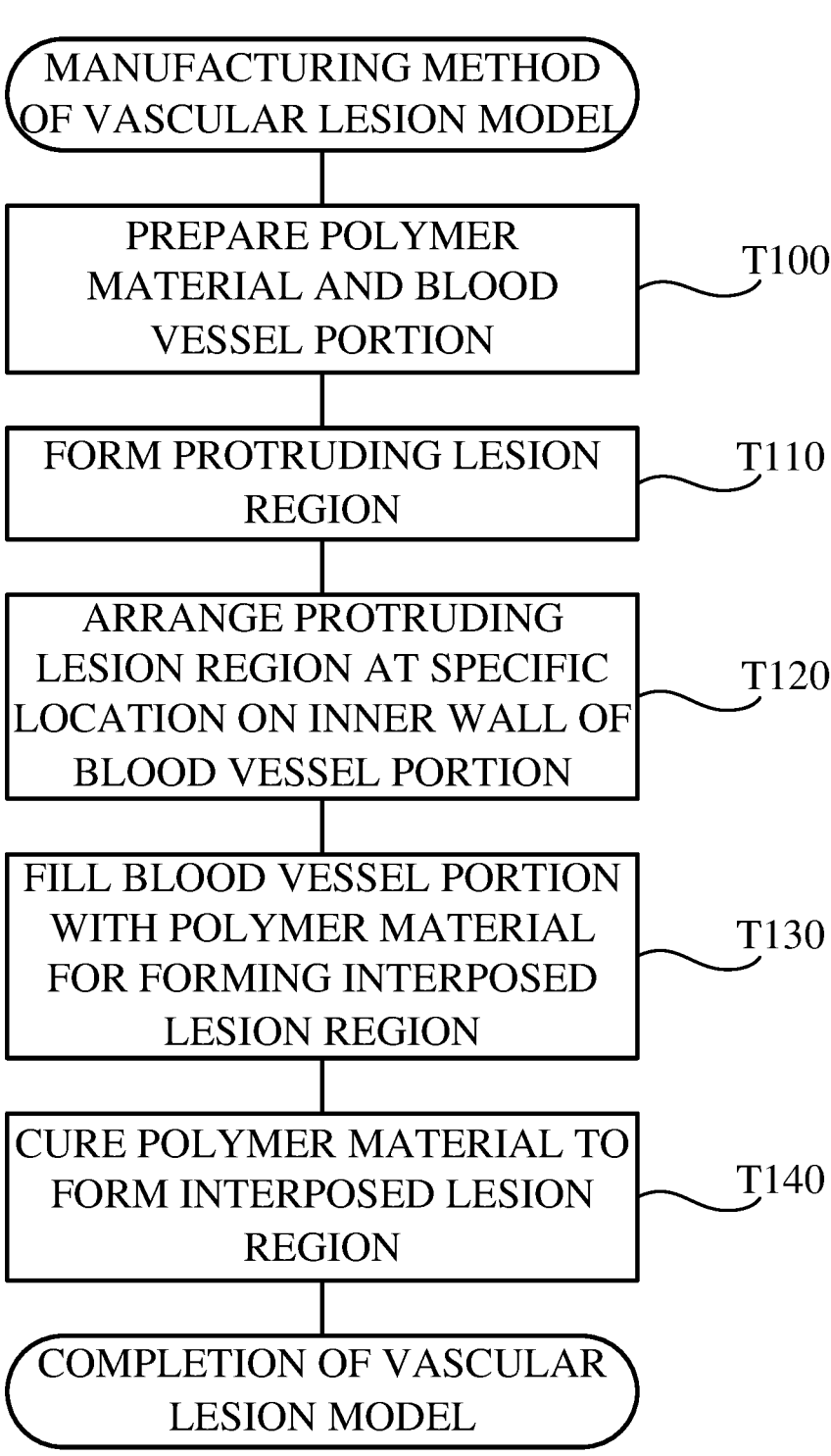
FIG. 4 is a flowchart illustrating a method of manufacturing the vascular lesion model according to the first embodiment.

FIG. 4 is a flowchart illustrating a method of manufacturing the vascular lesion model 10. To manufacture the vascular lesion model 10, first, a polymer material for forming each lesion region and a tubular member that forms the blood vessel portion 30 are prepared (step T100). Here, for each lesion region, the concentration of a polymer material selected in advance is adjusted to a preset concentration by using an appropriate solvent such as water. If necessary, the polymer material is melted by heating or the like, and if required, other materials are further added to the mixture to prepare the polymer material in an uncured state. Subsequently, the protruding lesion regions 22 are formed (step T110). For example, the protruding lesion regions 22 are produced by curing the material for the protruding lesion regions 22 prepared in step T100 in a mold to mold the material into a desired shape. In step T110, the material may be cooled as necessary. Alternatively, at least one of the two protruding lesion regions 22 may be formed as the porous polymer body described above.

Next, the protruding lesion regions 22 produced in step T110 are arranged at specific locations on the inner wall of the blood vessel portion 30 (step T120). In the present embodiment, the protruding lesion regions 22 obtained by curing and molding the polymer material in advance are arranged inside the blood vessel portion 30 (step T110 and step T120). However, an uncured polymer material for forming the protruding lesion regions 22 may be arranged inside the blood vessel portion 30, and then, the polymer material may be cured to form the protruding lesion regions 22. Subsequently, the blood vessel portion 30 is filled with a polymer material for forming the interposed lesion region 23 (step T130), and the polymer material filled into the blood vessel portion is cured to form the interposed lesion region 23 (step T140), and thus, the vascular lesion model 10 is completed.

The vascular lesion model 10 may be directly used for training and the like employing a medical device, or may be used while being immersed into a fluid (for example, simulated blood such as physiological saline). Alternatively, if the lesion portion does not occlude the blood vessel portion 30 in the vascular lesion model 10, a flow path for a fluid (for example, simulated blood such as physiological saline) may be connected to the vascular lesion model 10 to circulate the fluid in the flow path including the blood vessel portion 30. The vascular lesion model 10 may be incorporated into an organ model simulating an organ such as a heart, liver, or brain, together with another vascular model that does not include a lesion portion. Alternatively, the vascular lesion model 10 may be incorporated into a human body simulation apparatus that simulates at least a part of a human body, together with another vascular model and an organ model that do not include a lesion portion.

According to the vascular lesion model 10 of the first embodiment configured as described above, the lesion portion 20 includes the protruding lesion regions 22 that are arranged to contact a part of the inner periphery of the blood vessel portion 30 in a cross section perpendicular to the longitudinal direction of the vascular lesion model 10 and that form the first lesion regions each having a shape that extends from the part of the inner periphery of the blood vessel portion 30 toward a center of the lesion portion 20. Therefore, it is possible to provide variations of vascular lesion models that are different from conventional models, as vascular lesion models corresponding to various clinical cases. In particular, if the protruding lesion regions 22 are formed to be harder than the interposed lesion region 23, the protruding lesion regions can be used to simulate a lesion region having higher hardness than other sections, such as a calcified lesion, for example. Therefore, it is possible to provide a lesion model that is similar to the aspects of lesions that are relatively frequently observed in clinical practice.

If adjacent lesion regions such as the protruding lesion regions 22 and the interposed lesion region 23 are formed by using the same type of polymer material, it is possible to increase the adhesion between the protruding lesion regions 22 and the interposed lesion region 23 to stabilize the structure of the lesion portion 20.

On the other hand, if adjacent lesion regions such as the protruding lesion regions 22 and the interposed lesion region 23 are formed of different types of materials, for example, if one lesion region is formed by using a porous body, it is possible to increase the adhesion between adjacent lesion regions to stabilize the structure of the lesion portion 20. Specifically, for example, if the protruding lesion regions 22 are formed of the above-described porous body of the polymer material, the uncured material of the interposed lesion region 23 is filled into the blood vessel portion 30, and thus, the polymer material forming the interposed lesion region 23 can penetrate into the pores of the porous body forming the protruding lesion regions 22. Therefore, the adhesion between the protruding lesion regions 22 and the interposed lesion region 23 can be increased. By adjusting the porosity of the porous polymer body forming the protruding lesion regions 22, it is possible to adjust the hardness of the protruding lesion regions 22 and the adhesion between the protruding lesion regions 22 and the interposed lesion region 23.

If the protruding lesion regions 22 are formed by a water-absorbing resin such as acrylamide or sodium acrylate, and the interposed lesion region 23 is formed by a water-soluble resin such as polyvinyl alcohol, water in the material of the interposed lesion region 23 is absorbed by the water-absorbing resin forming the protruding lesion regions 22 when the material of the interposed lesion region 23 is filled into the blood vessel portion 30, and thus, it is possible to increase the adhesion between the protruding lesion regions 22 and the interposed lesion region 23.

B. Second Embodiment

Figure 5:
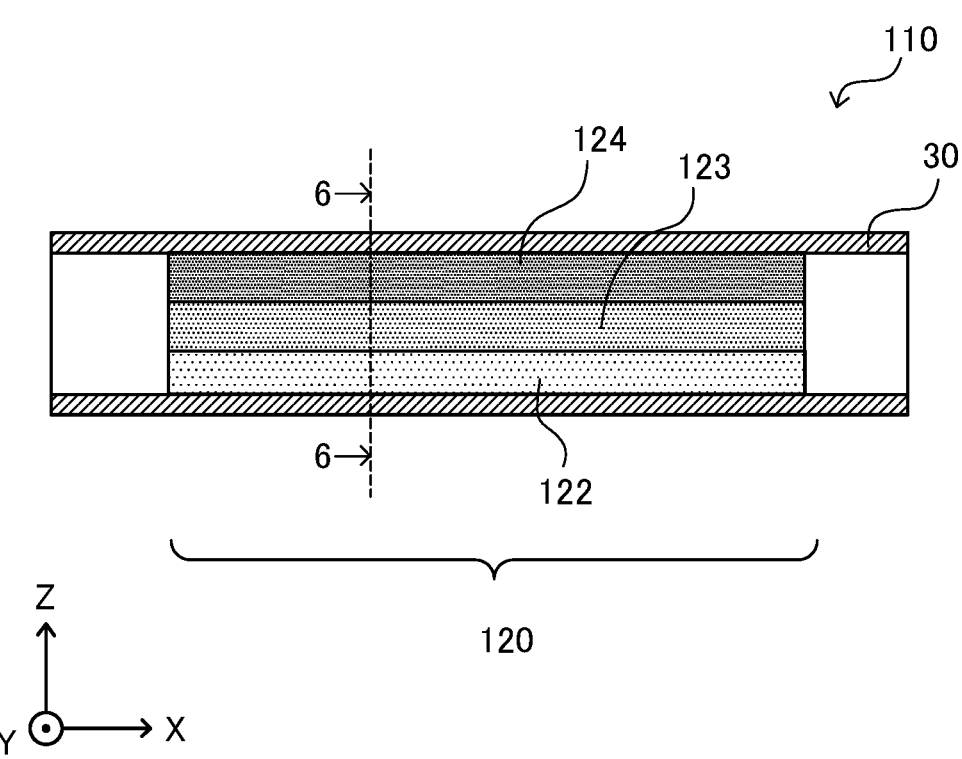
FIG. 5 is a cross-sectional view schematically illustrating an overall configuration of a vascular lesion model according to a second embodiment.
Figure 6:
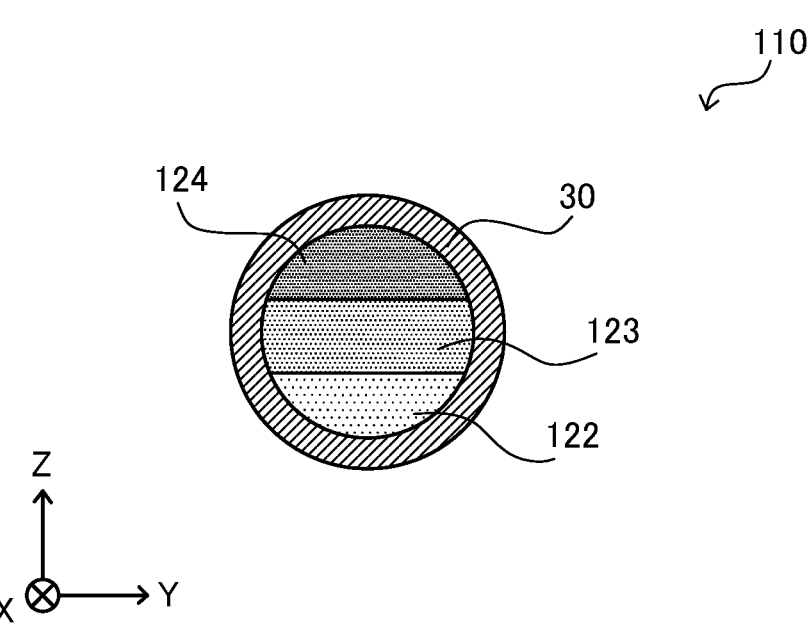
FIG. 6 is a cross-sectional view schematically illustrating a state of a cross section perpendicular to a longitudinal direction of the vascular lesion model.

FIG. 5 is a cross-sectional view schematically illustrating, similarly to FIG. 1, an overall configuration of a vascular lesion model 110 according to a second embodiment. FIG. 6 is a cross-sectional view schematically illustrating a state of a cross section perpendicular to a longitudinal direction of the vascular lesion model 110. In FIG. 5, a position of the cross section of FIG. 6 is illustrated as a cross section 6-6.

The vascular lesion model 110 of the second embodiment includes a lesion portion 120 that simulates a lesion formed in a blood vessel, and the blood vessel portion 30 that is similar to that of the first embodiment. In the present embodiment, the lesion portion 120 occludes the blood vessel portion 30, and the lesion portion 120 is divided into a lower layer lesion region 122, an intermediate layer lesion region 123, and an upper layer lesion region 124, which are lesion regions formed in a layered shape. In the second embodiment, the lesion portion 120 is divided into three layers. However, the lesion portion 120 may be divided into two layers, or may be divided into four or more layers.

As illustrated in FIG. 6, the lower layer lesion region 122 and the upper layer lesion region 124 are arranged to contact a part of the inner periphery of the blood vessel portion 30 in a cross section perpendicular to the longitudinal direction of the vascular lesion model 110 and correspond to the "first lesion regions" each having a shape that extends from the part of the inner periphery of the blood vessel portion 30 toward the center of the lesion portion 120. As illustrated in FIG. 5, the lower layer lesion region 122 and the upper layer lesion region 124 are provided continuously from one end to the other end of the lesion portion 120 in the longitudinal direction. It can be said that, in a cross section perpendicular to the longitudinal direction, the lesion portion 120 of the second embodiment is divided into a plurality of lesion regions including the above-described first lesion regions, by a plurality of lines connecting two points on the inner periphery of the blood vessel portion 30 and not intersecting one another. It is not required that, in the cross section perpendicular to the longitudinal direction of the vascular lesion model 110, a line forming a boundary between the lower layer lesion region 122 and the intermediate layer lesion region 123 and a line forming a boundary between the intermediate layer lesion region 123 and the upper layer lesion region 124 are parallel, and an angle formed by these lines can be set freely within a range in which these lines do not intersect.

In the second embodiment, the lower layer lesion region 122, the intermediate layer lesion region 123, and the upper layer lesion region 124 have different hardness. In FIGS. 5 and 6, a darker hatching of a lesion region indicates that the lesion region is harder. That is, in the second embodiment, the upper layer lesion region 124, the intermediate layer lesion region 123, and the lower layer lesion region 122 are formed so that the hardness decreases in this order. However, the combination of hardness in the lesion regions may be different from the one described above.

The lower layer lesion region 122, the intermediate layer lesion region 123, and the upper layer lesion region 124 may be formed by using one or a plurality of polymer materials selected from various polymer materials similar to those of the protruding lesion regions 22 and the interposed lesion region 23 in the first embodiment. The polymer materials forming each of the lower layer lesion region 122, the intermediate layer lesion region 123, and the upper layer lesion region 124 may be materials of the same type or of different types. Similarly to the first embodiment, at least a part of the lower layer lesion region 122, the intermediate layer lesion region 123, and the upper layer lesion region 124 may further contain an inorganic material in addition to the polymer material. It is possible to change the hardness of the lesion regions by adjusting at least one of the type of the polymer material, the concentration of the polymer material, the type of another material such as an inorganic material added to the polymer material, the mixing ratio of the other material, the particle size of the other material, and the like in the materials forming each of the lesion regions. Moreover, at least a part of the lesion regions among the plurality of lesion regions included in the lesion portion 120 may be formed by using a porous polymer body, as described in the first embodiment.

Figure 7:
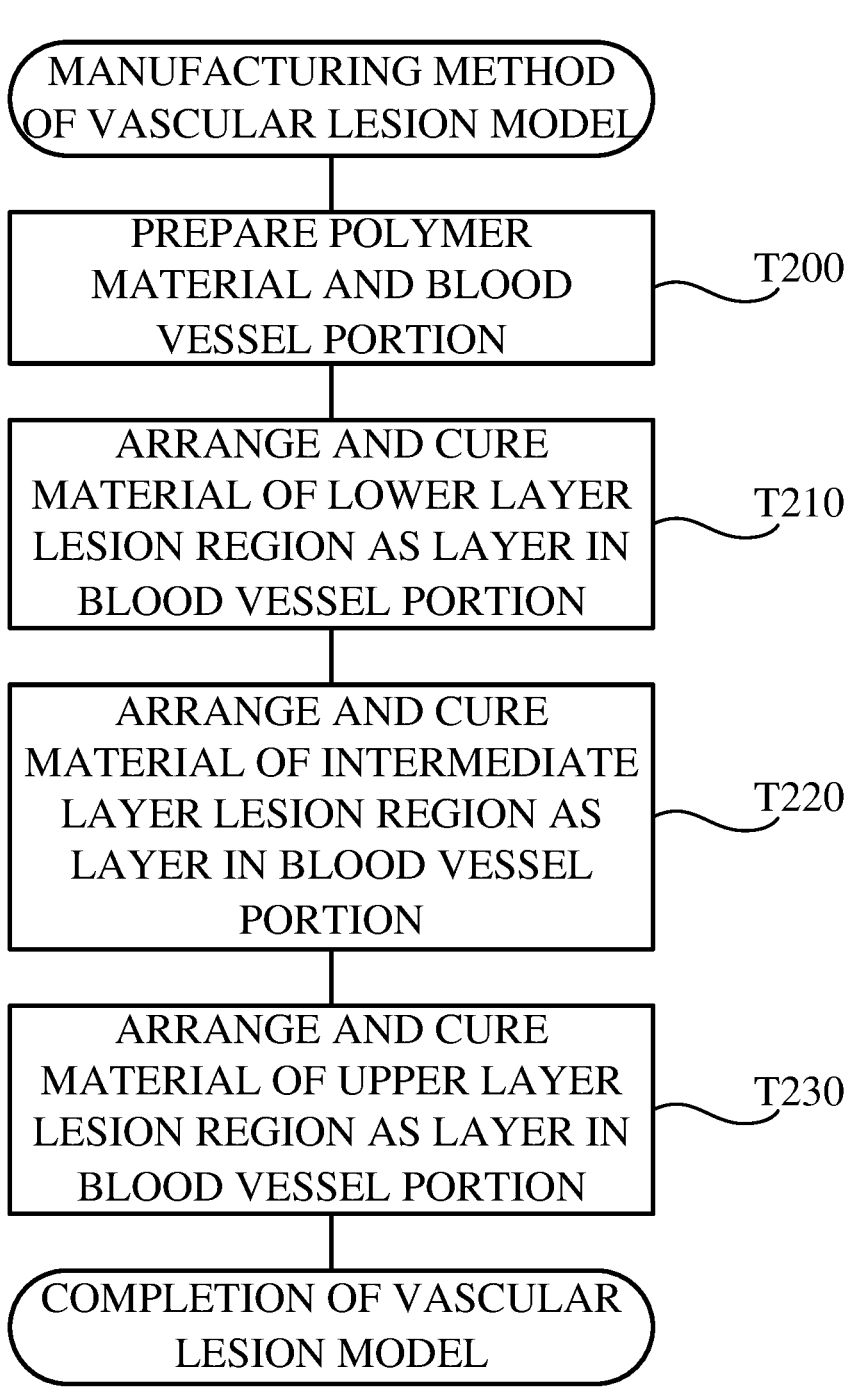
FIG. 7 is a flowchart illustrating a method of manufacturing the vascular lesion model according to the second embodiment.

FIG. 7 is a flowchart illustrating a method of manufacturing the vascular lesion model 110 according to the second embodiment. To manufacture the vascular lesion model 110, first, similarly to step T100, a polymer material for forming each lesion region and a tubular member that forms the blood vessel portion 30 are prepared (step T200). After that, the material of the lower layer lesion region 122 is arranged as a layer in the blood vessel portion 30 and cured (step T210). Subsequently, the material of the intermediate layer lesion region 123 is arranged on the formed lower layer lesion region 122 in the blood vessel portion 30 and cured (step T220). In the blood vessel portion 30, the material of the upper layer lesion region 124 is further arranged on the formed intermediate layer lesion region 123 and cured (step T230) to complete the vascular lesion model 110. Thus, by repeating the operation of arranging and curing the materials for each lesion region in the form of layers in the blood vessel portion 30, the lower layer lesion region 122, the intermediate layer lesion region 123, and the upper layer lesion region 124 are sequentially formed to complete the vascular lesion model 110.

When each lesion region is cured, it is only required that an end portion of the section where the lesion portion 120 is to be formed in the blood vessel portion 30 is occluded. Further, similarly to the manufacturing method illustrated in FIG. 7, at least a part of the lesion regions may be cured and molded in advance outside the blood vessel portion 30 and then arranged inside the blood vessel portion 30, instead of forming all the lesion regions by curing the polymer material within the blood vessel portion 30. In addition, a three-layer structured body including three layers corresponding to the lower layer lesion region 122, the intermediate layer lesion region 123, and the upper layer lesion region 124 may be manufactured outside the blood vessel portion 30, and a columnar member having a diameter of a size corresponding to the inner diameter of the blood vessel portion 30 may be cut out from the three-layer structured body and arranged in the blood vessel portion 30.

According to such a configuration, the lesion portion 120 includes the lower layer lesion region 122 and the upper layer lesion region 124 that form the first lesion regions arranged to contact a part of the inner periphery of the blood vessel portion 30 in a cross section perpendicular to the longitudinal direction and each having a shape that extends from the part of the inner periphery of the blood vessel portion 30 toward the center of the lesion portion 120. Therefore, it is possible to provide variations of vascular lesion models that are different from conventional models, as vascular lesion models corresponding to various clinical cases. Further, when forming such a plurality of lesion regions, the type of polymer material forming each lesion region is appropriately selected, and a part of the lesion regions is formed by using a porous polymer body, or a part of the lesion regions is formed by using a water-absorbing resin, so that an effect similar to the effect described in the first embodiment can be obtained.

C. Third Embodiment

Figure 8:
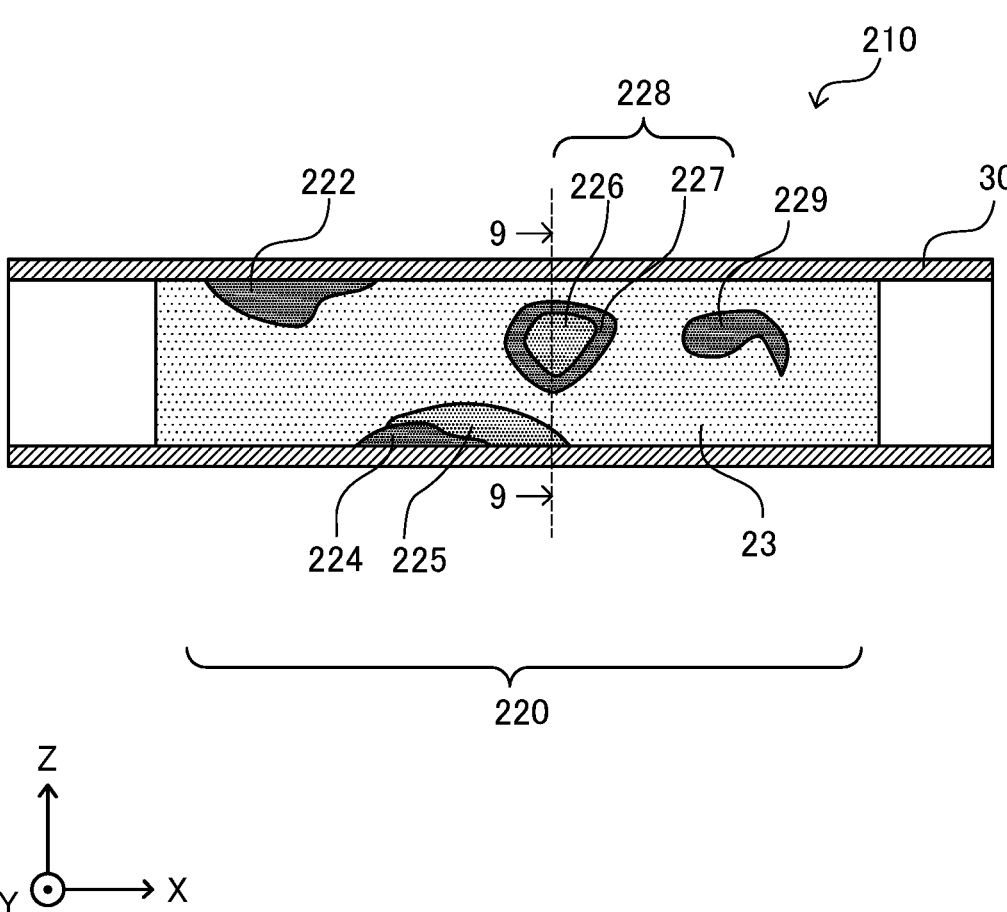
FIG. 8 is a cross-sectional view schematically illustrating an overall configuration of a vascular lesion model according to a third embodiment.
Figure 9:
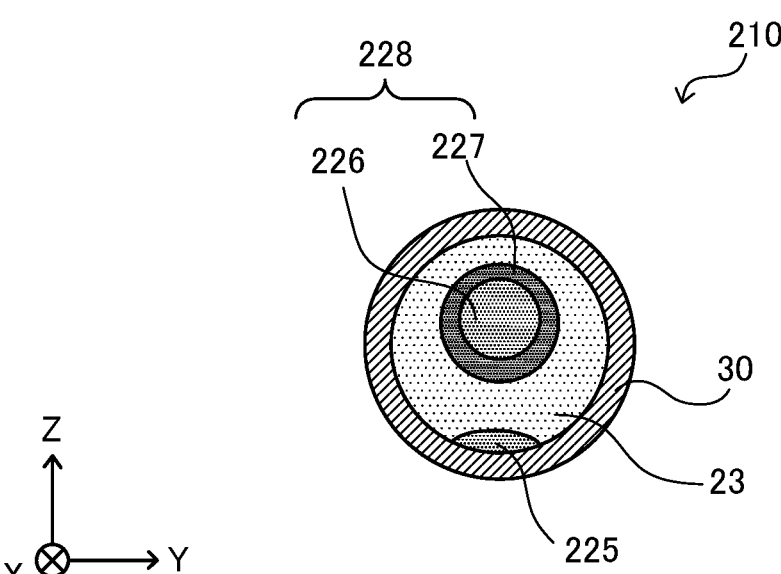
FIG. 9 is a cross-sectional view schematically illustrating a state of a cross section perpendicular to a longitudinal direction of the vascular lesion model.

FIG. 8 is a cross-sectional view schematically illustrating, similarly to FIG. 1, an overall configuration of a vascular lesion model 210 according to a third embodiment. FIG. 9 is a cross-sectional view schematically illustrating a state of a cross section perpendicular to a longitudinal direction of the vascular lesion model 210. In FIG. 8, a position of the cross section of FIG. 9 is illustrated as a cross section 9-9.

The vascular lesion model 210 of the third embodiment includes a lesion portion 220 that simulates a lesion formed in a blood vessel, and the blood vessel portion 30 that is similar to that of the first embodiment. In the present embodiment, the lesion portion 220 occludes the blood vessel portion 30. The lesion portion 220 includes protruding lesion regions 222, 224, and 225, the interposed lesion region 23, and floating lesion regions 228 and 229. The number of protruding lesion regions and the number of floating lesion regions may be different from the numbers mentioned above, for example, one or more.

Each of the protruding lesion regions 222, 224, and 225 is arranged to contact a part of the inner periphery of the blood vessel portion 30 in a cross section perpendicular to the longitudinal direction of the vascular lesion model 210 and corresponds to one of the "first lesion regions" each having a shape that extends from the part of the inner periphery of the blood vessel portion 30 toward the center of the lesion portion 220. As illustrated in FIG. 8, the protruding lesion regions 222, 224, and 225 are arranged separated from both ends of the lesion portion 220 in the longitudinal direction.

As illustrated in FIGS. 8 and 9, the floating lesion regions 228 and 229 each have a solid shape separated from the outer periphery of the lesion portion 220 in both a cross section perpendicular to the longitudinal direction and a cross section parallel to the longitudinal direction. That is, the floating lesion regions 228 and 229 are separated from the entire outer surface of the lesion portion 220. Specifically, the floating lesion regions 228 and 229 are provided separated from both ends of the lesion portion 220 in the longitudinal direction and from side surfaces of the lesion portion 220 contacting the inner wall of the blood vessel portion 30. As used herein, the term "solid shape" is not limited to a lesion region having a dense structure, and includes a lesion region including the above-described porous polymer body. The term "solid shape" does not include a lesion region formed in a tubular shape. The floating lesion regions 228 and 229 are also called "second lesion regions".

The floating lesion region 228 includes a core portion 226 and a surface layer portion 227 covering a surface of the core portion 226. The interposed lesion region 23 is a region other than the protruding lesion regions 222, 224, and 225 and the floating lesion regions 228 and 229 in the lesion portion 220.

In FIGS. 8 and 9, a darker hatching of a lesion region indicates that the lesion region is harder. That is, in the third embodiment, the protruding lesion regions 222 and 224, the surface layer portion 227 of the floating lesion region 228, and the floating lesion region 229 are formed with the same hardness, and the protruding lesion region 225 and the core portion 226 of the floating lesion region 228 are formed to have the same hardness, which is softer than the hardness mentioned above, and the interposed lesion region 23 is formed to be the softest region. As described above, in the third embodiment, the floating lesion region 228, which is the second lesion region, is formed so that a section including the surface of the floating lesion region 228 and another section of the floating lesion region 228 have different hardness. However, the combination of hardness in the lesion regions may be different from the one described above.

Each lesion region included in the lesion portion 220 of the third embodiment may be formed by using one or a plurality of polymer materials selected from various polymer materials similar to those of the protruding lesion regions 22 and the interposed lesion region 23 of the first embodiment. The polymer materials forming each lesion region included in the lesion portion 220 may be materials of the same type or of different types. Similarly to the first embodiment, at least a part of the lesion regions included in the lesion portion 220 may further contain an inorganic material, in addition to the polymer material. It is possible to change the hardness of the lesion regions by adjusting at least one of the type of the polymer material, the concentration of the polymer material, the type of another material such as an inorganic material added to the polymer material, the mixing ratio of the other material, the particle size of the other material, and the like in the materials forming each of the lesion regions. Moreover, at least a part of the lesion regions among the plurality of lesion regions included in the lesion portion 220 may be formed by using a polymer material formed by a porous body, as described in the first embodiment.

Figure 10:
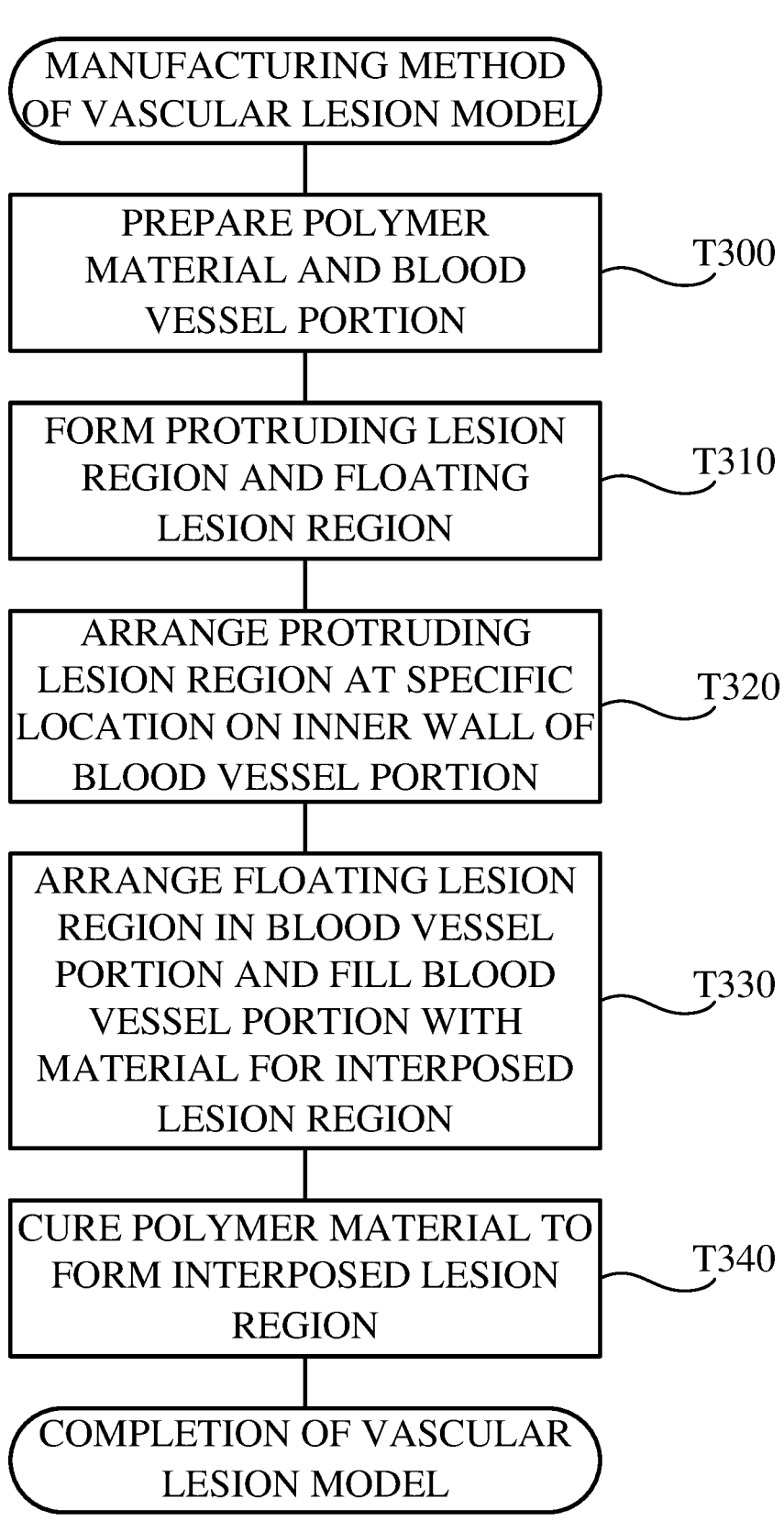
FIG. 10 is a flowchart illustrating a method of manufacturing the vascular lesion model according to the third embodiment.

FIG. 10 is a flowchart illustrating a method of manufacturing the vascular lesion model 210 according to the third embodiment. To manufacture the vascular lesion model 210, first, similarly to step T100, a polymer material for forming each lesion region and a tubular member that forms the blood vessel portion 30 are prepared (step T300). Subsequently, the protruding lesion regions 222, 224, and 225 and the floating lesion regions 228 and 229 are formed (step T310). The protruding lesion regions 222, 224, and 225 and the floating lesion regions 228 and 229 are formed, for example, by curing the material for each lesion region prepared in step T300 in a mold prepared in advance according to the shape of the lesion region and molding the material into a desired shape. Alternatively, at least one of the protruding lesion regions 222, 224, and 225 and the floating lesion regions 228 and 229 may be formed as the porous polymer body described above.

Next, the protruding lesion regions 222, 224, and 225 produced in step T310 are arranged at specific locations on the inner wall of the blood vessel portion 30 (step T320). In the present embodiment, the protruding lesion regions 222, 224, and 225 obtained by curing and molding the polymer material in advance are arranged inside the blood vessel portion 30 (step T310 and step T320). However, the uncured polymer material for forming the protruding lesion regions 222, 224, and 225 may be arranged at specific locations inside the blood vessel portion 30, and then, the polymer material may be cured to form the protruding lesion regions 222, 224, and 225. Subsequently, the floating lesion regions 228 and 229 are arranged in the blood vessel portion 30 and the blood vessel portion 30 is filled with a polymer material for forming the interposed lesion region 23 (step T330), and the polymer material filled into the blood vessel portion 30 is cured to form the interposed lesion region 23 (step T340), and thus, the vascular lesion model 210 is completed. In step T330, the viscosity of the polymer material for forming the interposed lesion region 23 is ensured so that the floating lesion regions 228 and 229 can be arranged at desired positions within the uncured polymer material for forming the interposed lesion region 23.

According to such a configuration, the lesion portion 220 includes the protruding lesion regions 222, 224, and 225 that form the first lesion regions arranged to contact a part of the inner periphery of the blood vessel portion 30 in a cross section perpendicular to the longitudinal direction of the vascular lesion model 210 and each having a shape that extends from the part of the inner periphery of the blood vessel portion 30 toward the center of the lesion portion 220. Further, a lesion portion 220 includes the floating lesion regions 228 and 229 forming the second lesion regions and each having a solid shape separated from the outer periphery of the lesion portion 220 in both a cross section perpendicular to the longitudinal direction and a cross section parallel to the longitudinal direction. Therefore, it is possible to provide variations of vascular lesion models that are different from conventional models, as vascular lesion models corresponding to various clinical cases. Further, when forming such a plurality of lesion regions, the type of polymer material forming each lesion region is appropriately selected, and a part of the lesion regions is formed by using a porous polymer body, or a part of the lesion regions is formed by using a water-absorbing resin, so that an effect similar to the effect described in the first embodiment can be obtained.

D. Fourth Embodiment

Figure 11:
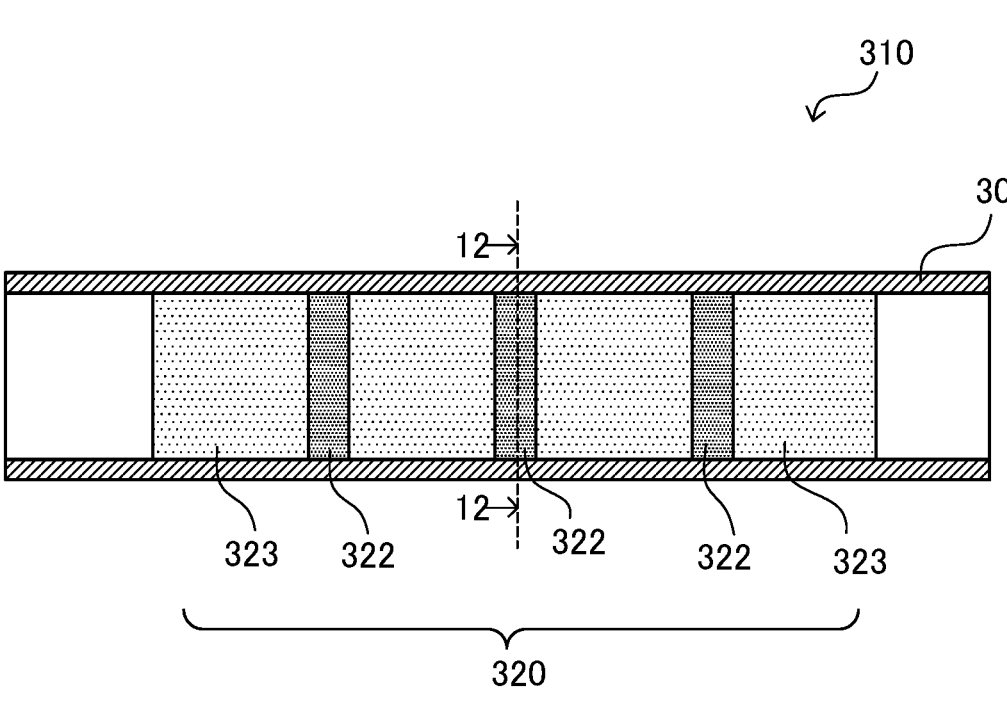
FIG. 11 is a cross-sectional view schematically illustrating an overall configuration of a vascular lesion model according to a fourth embodiment.
Figure 11:
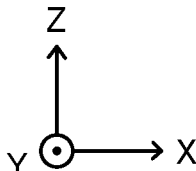
Figure 12:
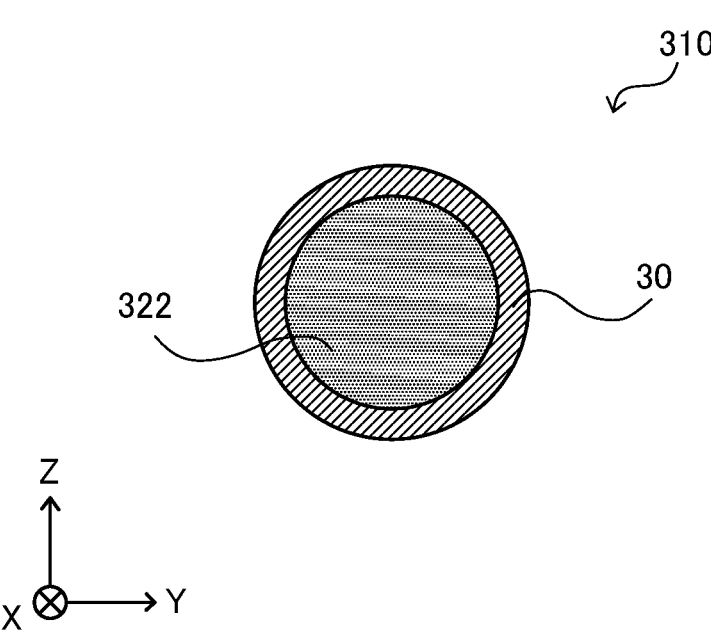
FIG. 12 is a cross-sectional view schematically illustrating a state of a cross section perpendicular to a longitudinal direction of the vascular lesion model.

FIG. 11 is a cross-sectional view schematically illustrating, similarly to FIG. 1, an overall configuration of a vascular lesion model 310 according to a fourth embodiment. FIG. 12 is a cross-sectional view schematically illustrating a state of a cross section perpendicular to a longitudinal direction of the vascular lesion model 310. In FIG. 11, a position of the cross section of FIG. 12 is illustrated as a cross section 12-12.

The vascular lesion model 310 of the fourth embodiment includes the lesion portion 320 that simulates a lesion formed in a blood vessel, and the blood vessel portion 30 that is similar to that of the first embodiment. The lesion portion 320 includes three occluded lesion regions 322 and four interposed lesion regions 323. The number of the occluded lesion regions 322 and the number of the interposed lesion regions 323 may be different from the numbers mentioned above, and may be one or more, and the types of lesion regions arranged at both end portions of the lesion portion 320 may be different.

In the lesion portion 320 of the fourth embodiment, both the occluded lesion regions 322 and the interposed lesion regions 323 are provided to occlude the blood vessel portion 30, and the occluded lesion regions 322 and the interposed lesion regions 323 are alternately arranged in the longitudinal direction. The three occluded lesion regions 322 and the two interposed lesion regions 323 of the four interposed lesion regions 323 located in the middle in the longitudinal direction are all arranged separated from both ends of the lesion portion 320 in the longitudinal direction and are provided to occlude the blood vessel portion 30. The occluded lesion regions 322 and the interposed lesion regions 323 are also referred to as "third lesion regions".

In FIGS. 10 and 11, a darker hatching of a lesion region indicates that the lesion region is harder. That is, in the fourth embodiment, the three occluded lesion regions 322 are all formed with the same hardness, the four interposed lesion regions 323 are all formed with the same hardness, and the occluded lesion regions 322 are formed harder than the interposed lesion regions 323. However, the combination of hardness in the lesion regions may be different from the one described above.

Further, in the fourth embodiment, the three occluded lesion regions 322 are all formed with the same length in the longitudinal direction (X-axis direction), the four interposed lesion regions 323 are all formed with the same length in the longitudinal direction (X-axis direction), and the occluded lesion regions 322 are formed shorter than the interposed lesion regions 323 in the longitudinal direction (X-axis direction). However, the relative relationship of the lengths of the lesion regions in the longitudinal direction may be different from the relationship described above, and the length of each lesion region in the longitudinal direction can be set freely.

Each lesion region included in the lesion portion 320 of the fourth embodiment may be formed by using one or a plurality of polymer materials selected from various polymer materials similar to those of the protruding lesion regions 22 and the interposed lesion region 23 of the first embodiment. The polymer materials forming each lesion region included in the lesion portion 320 may be materials of the same type or of different types. Similarly to the first embodiment, at least a part of the lesion regions included in the lesion portion 320 may further contain an inorganic material, in addition to the polymer material. It is possible to change the hardness of the lesion regions by adjusting at least one of the type of the polymer material, the concentration of the polymer material, the type of another material such as an inorganic material added to the polymer material, the mixing ratio of the other material, the particle size of the other material, and the like in the materials forming each of the lesion regions. Moreover, at least a part of the lesion regions among the plurality of lesion regions included in the lesion portion 320 may be formed by using a polymer material formed by a porous body, as described in the first embodiment.

Figure 13:
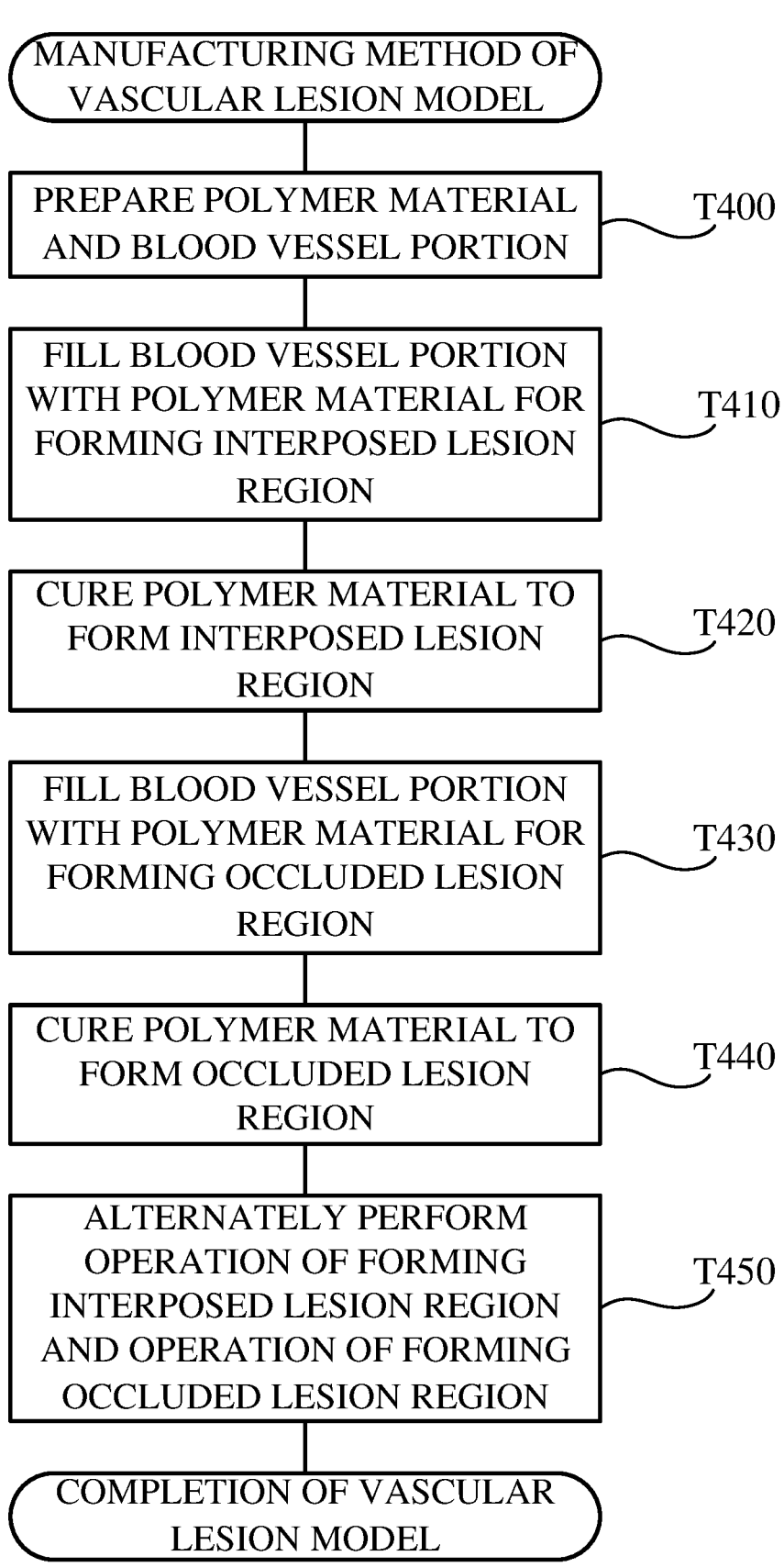
FIG. 13 is a flowchart illustrating a method of manufacturing the vascular lesion model according to the fourth embodiment.

FIG. 13 is a flowchart illustrating a method of manufacturing the vascular lesion model 310 according to the fourth embodiment. To manufacture the vascular lesion model 310, first, similarly to step T100, a polymer material for forming each lesion region and a tubular member that forms the blood vessel portion 30 are prepared (step T400). After that, the blood vessel portion 30 is filled with a polymer material for forming the interposed lesion regions 323 (step T410), and the polymer material filled into the blood vessel portion 30 is cured to form the interposed lesion regions 323 (step T420). Subsequently, the blood vessel portion 30 is further filled with a polymer material for forming the occluded lesion regions 322 (step T430), and the polymer material filled into the blood vessel portion 30 is cured to form the occluded lesion regions 322 (step T440). The operation of forming the interposed lesion regions 323 in step T410 and step T420 and the operation of forming the occluded lesion regions 322 in step T430 and step T440 are alternately performed (step T450) to form a preset number of the protruding lesion regions 22 and the interposed lesion regions 23 and complete the vascular lesion model 310.

When the interposed lesion regions 323 are first formed in steps T410 and T420, an end portion of the section where the lesion portion 320 is to be formed in the blood vessel portion 30 may be occluded. Further, similarly to the manufacturing method illustrated in FIG. 13, at least a part of the lesion regions may be cured and molded in advance outside the blood vessel portion 30 by using a mold, for example, and then arranged in the blood vessel portion 30, instead of forming all the lesion regions by curing the polymer material within the blood vessel portion 30. At least one of the plurality of occluded lesion regions 322 and interposed lesion regions 323 may be formed as the porous polymer body described above.

According to such a configuration, the lesion portion 320 includes the occluded lesion regions 322 and the interposed lesion regions 323 forming the third lesion regions that are arranged separated from both ends of the lesion portion 320 in the longitudinal direction, and provided to occlude the blood vessel portion 30. Therefore, it is possible to provide variations of vascular lesion models that are different from conventional models, as vascular lesion models corresponding to various clinical cases.

In particular, when the occluded lesion regions 322 are formed harder than the interposed lesion regions 323, which are lesion regions arranged adjacent to the occluded lesion regions 322, it is possible to use the occluded lesion regions 322 to simulate a lesion region that is harder than other sections, such as a calcified lesion, for example. Specifically, when a medical device is inserted into a vascular lesion model, the model may have a design in which the lesion portion is occluded by a lesion region inside the lesion portion having higher hardness. Therefore, it is possible to provide a lesion model that is similar to the aspects of lesions that are relatively frequently observed in clinical practice.

Further, when forming such a plurality of lesion regions, the type of polymer material forming each lesion region is appropriately selected, and a part of the lesion regions is formed by using a porous polymer body, or a part of the lesion regions is formed by using a water-absorbing resin, so that an effect similar to the effect described in the first embodiment can be obtained.

E. Fifth Embodiment

Figure 14:
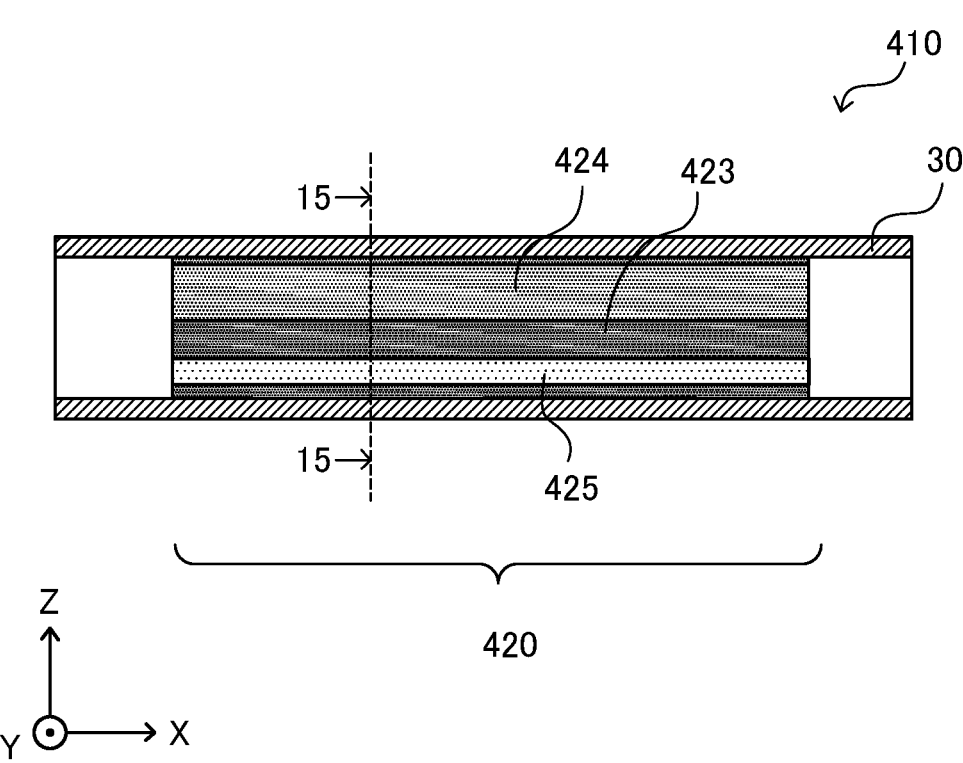
FIG. 14 is a cross-sectional view schematically illustrating an overall configuration of a vascular lesion model according to a fifth embodiment.
Figure 15:
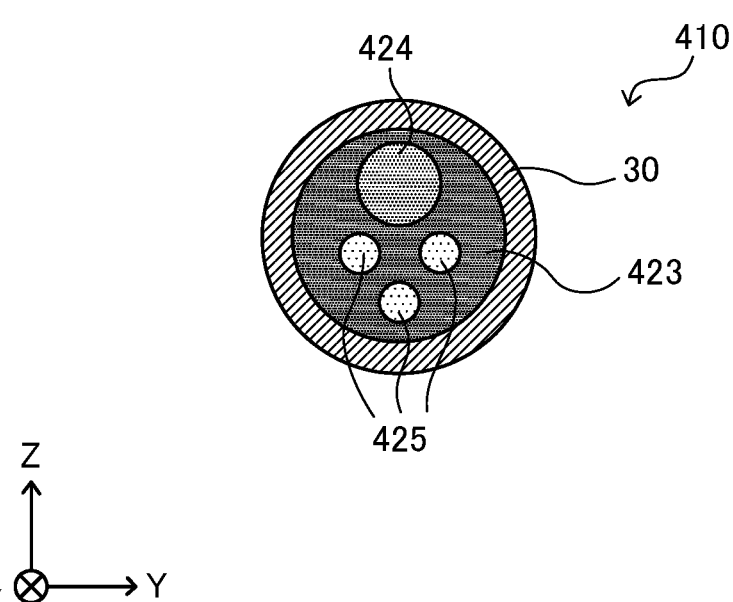
FIG. 15 is a cross-sectional view schematically illustrating a state of a cross section perpendicular to a longitudinal direction of the vascular lesion model.

FIG. 14 is a cross-sectional view schematically illustrating, similarly to FIG. 1, an overall configuration of a vascular lesion model 410 according to a fifth embodiment. FIG. 15 is a cross-sectional view schematically illustrating a state of a cross section perpendicular to a longitudinal direction of the vascular lesion model 410. In FIG. 14, a position of the cross section of FIG. 15 is illustrated as a cross section 15-15.

The vascular lesion model 410 of the fifth embodiment includes a lesion portion 420 that simulates a lesion formed in a blood vessel, and the blood vessel portion 30 that is similar to that of the first embodiment. The lesion portion 420 includes one penetrating lesion region 424, three penetrating lesion regions 425, and an interposed lesion region 423 that is a region other than the penetrating lesion regions 424 and 425. The numbers of the penetrating lesion regions 424 and 425 may be different from those mentioned above, for example, one or more.

In the lesion portion 420 of the fifth embodiment, the penetrating lesion regions 424 and 425 are all provided separated from the inner periphery of the blood vessel portion 30 in a cross section perpendicular to the longitudinal direction, and are arranged independently and separately from one another. Herein, the expression "arranged independently and separately from one another" does not simply mean that the lesion regions are apart from one another. For example, this expression does not include a case where one lesion region is encompassed by another lesion region, such as a case where one lesion region is arranged in another lesion region formed in a tubular shape. In the present embodiment, each of the penetrating lesion regions 424 and 425 is formed continuously from one end to the other end of the lesion portion 420 in the longitudinal direction, and penetrates the lesion portion 420 in the longitudinal direction. However, at least a part of the penetrating lesion regions 424 and 425 may be provided to be separated from at least one of the end portions of the lesion portion 420 in the longitudinal direction. The penetrating lesion regions 424, 425 are also referred to as "fourth lesion regions".

In FIGS. 14 and 15, a darker hatching of a lesion region indicates that the lesion region is harder. That is, in the fifth embodiment, the penetrating lesion regions 425 are all formed with the same hardness, and the penetrating lesion region 424 is harder than the penetrating lesion regions 425. The interposed lesion region 423 is formed harder than the penetrating lesion regions 424 and 425. However, the combination of hardness in the lesion regions may be different from the one described above.

In the fifth embodiment, the one penetrating lesion region 424 is formed with a larger diameter than the three penetrating lesion regions 425 in a cross section perpendicular to the longitudinal direction. However, the numbers of the penetrating lesion regions 424 and 425 may be different from those mentioned above, for example, one or more. Further, the arrangement of the penetrating lesion region 424 and the penetrating lesion regions 425 in a cross section perpendicular to the longitudinal direction may be different from that illustrated in FIG. 15.

Each lesion region included in the lesion portion 420 of the fifth embodiment may be formed by using one or a plurality of polymer materials selected from various polymer materials similar to those of the protruding lesion regions 22 and the interposed lesion region 23 of the first embodiment. The polymer materials forming each lesion region included in the lesion portion 420 may be materials of the same type or of different types. Similarly to the first embodiment, at least a part of the lesion regions included in the lesion portion 420 may further contain an inorganic material, in addition to the polymer material. It is possible to change the hardness of the lesion regions by adjusting at least one of the type of the polymer material, the concentration of the polymer material, the type of another material such as an inorganic material added to the polymer material, the mixing ratio of the other material, the particle size of the other material, and the like in the materials forming each of the lesion regions. Moreover, at least a part of the lesion regions among the plurality of lesion regions included in the lesion portion 420 may be formed by using a polymer material formed by a porous body, as described in the first embodiment.

Figure 16:
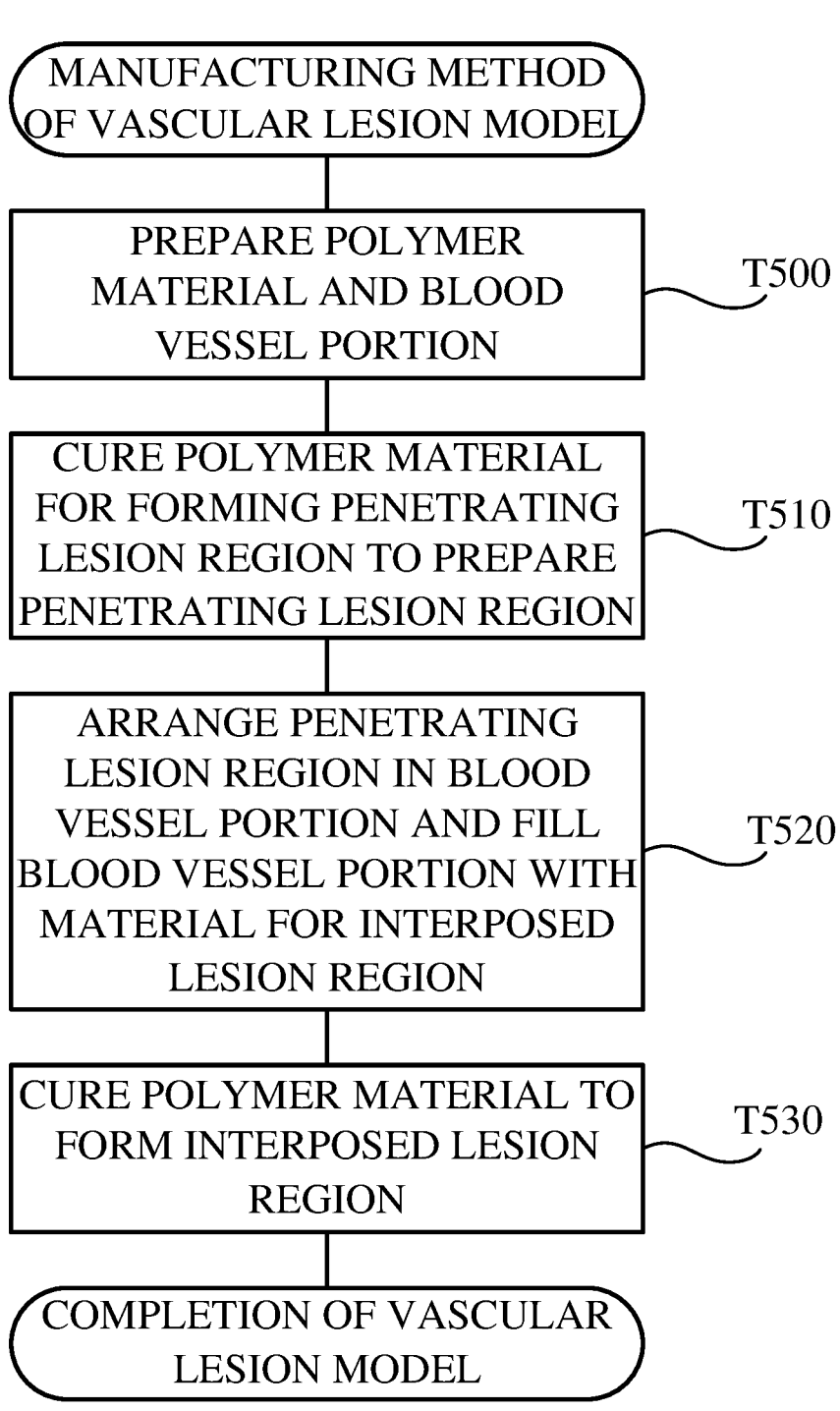
FIG. 16 is a flowchart illustrating a method of manufacturing the vascular lesion model according to the fifth embodiment.

FIG. 16 is a flowchart illustrating a method of manufacturing the vascular lesion model 410 according to the fifth embodiment. To manufacture the vascular lesion model 410, first, similarly to step T100, a polymer material for forming each lesion region and a tubular member that forms the blood vessel portion 30 are prepared (step T500). After that, a polymer material for forming the penetrating lesion regions 424 and 425 is cured to prepare the penetrating lesion regions 424 and 425 (step T510). The penetrating lesion regions 424 and 425 may be formed, for example, by curing the material for each lesion region prepared in step T500 in a mold having a hollow cylindrical shape prepared in advance according to the shape of the lesion region and molding the material into a columnar shape. At this time, at least one of the penetrating lesion regions 424 and 425 may be formed as the porous polymer body described above.

Subsequently, the penetrating lesion regions 424 and 425 prepared in step T510 are arranged in the blood vessel portion 30 and the blood vessel portion 30 is filled with a polymer material for forming the interposed lesion region 23 (step T520), and the polymer material filled into the blood vessel portion 30 is cured to form the interposed lesion region 23 (step T530), and thus, the vascular lesion model 410 is completed. In step T520, the viscosity of the polymer material for forming the interposed lesion region 23 is ensured so that the penetrating lesion regions 424 and 425 can be arranged at desired positions within the uncured polymer material for forming the interposed lesion region 23.

According to such a configuration, the lesion portion 420 includes the penetrating lesion regions 424 and 425 forming a plurality of fourth lesion regions that are provided separated from the inner periphery of the blood vessel portion 30 in a cross section perpendicular to the longitudinal direction, and are arranged independently and separately from one another. Therefore, it is possible to provide variations of vascular lesion models that are different from conventional models, as vascular lesion models corresponding to various clinical cases. Further, when forming such a plurality of lesion regions, the type of polymer material forming each lesion region is appropriately selected, and a part of the lesion regions is formed by using a porous polymer body, or a part of the lesion regions is formed by using a water-absorbing resin, so that an effect similar to the effect described in the first embodiment can be obtained.

In particular, by forming the penetrating lesion region 424, which is one of the plurality of fourth lesion regions, harder than the penetrating lesion regions 425, which are the other fourth lesion regions, it is possible to use the penetrating lesion region 424 to simulate a lesion region that is harder than other sections, such as a calcified lesion, for example. Therefore, it is possible to provide a lesion model that is similar to the aspects of lesions that are relatively frequently observed in clinical practice.

F. Sixth Embodiment

In the sixth embodiment, an example in which a lesion portion included in a vascular lesion model constricts a blood vessel portion will be described in detail. Below, a structure that imitates a state where the lesion portion constricts the blood vessel portion 30 without occluding the blood vessel portion 30 in a lesion portion similar to the second embodiment will be described.

Figure 17:
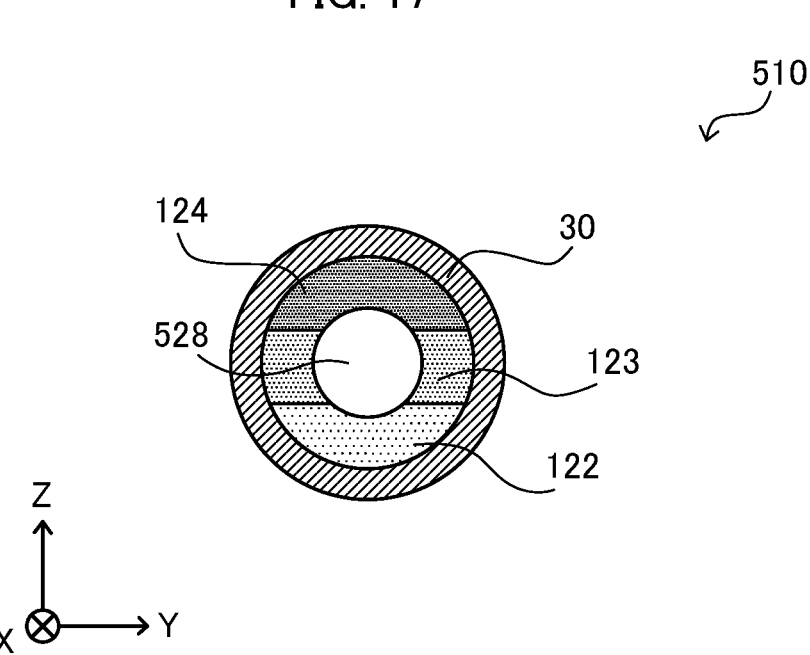
FIG. 17 is a cross-sectional view schematically illustrating a vascular lesion model according to a sixth embodiment.

FIG. 17 is a cross-sectional view schematically illustrating a state of a cross section perpendicular to a longitudinal direction of a vascular lesion model 510 according to a sixth embodiment. Similarly to the second embodiment, the vascular lesion model 510 includes the lower layer lesion region 122, the intermediate layer lesion region 123, and the upper layer lesion region 124, and further includes a through-hole 528 penetrating the lesion portion in the longitudinal direction. FIG. 17 illustrates a state where the through-hole 528 formed concentrically with the blood vessel portion 30 is provided in a cross section perpendicular to the longitudinal direction of the vascular lesion model 510.

Figure 18:
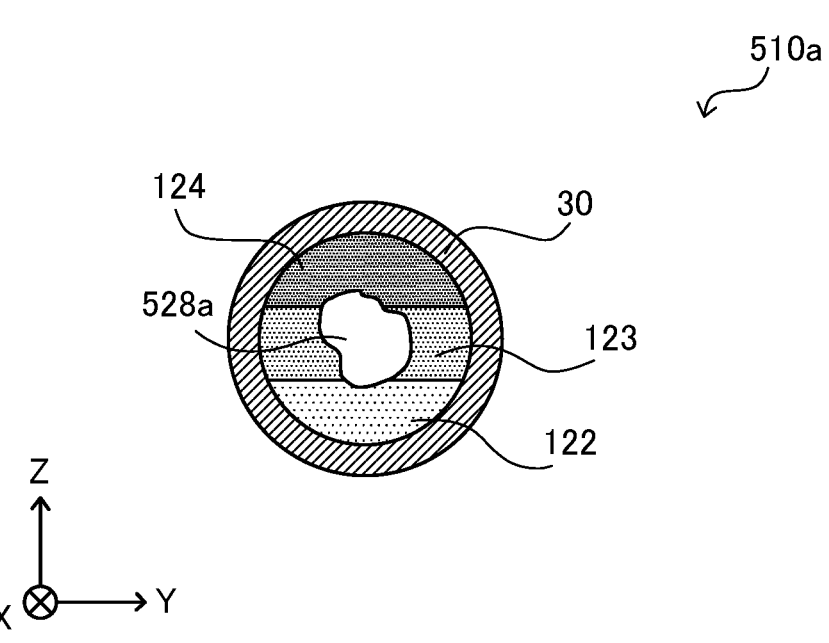
FIG. 18 is a cross-sectional view schematically illustrating a vascular lesion model according to a modification of the sixth embodiment.
Figure 19:
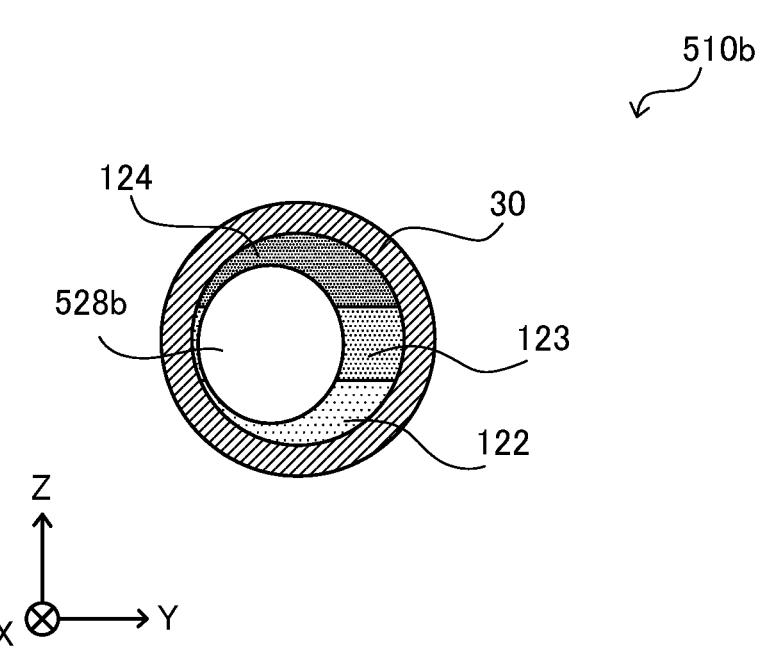
FIG. 19 is a cross-sectional view schematically illustrating a vascular lesion model according to a modification of the sixth embodiment.
Figure 20:
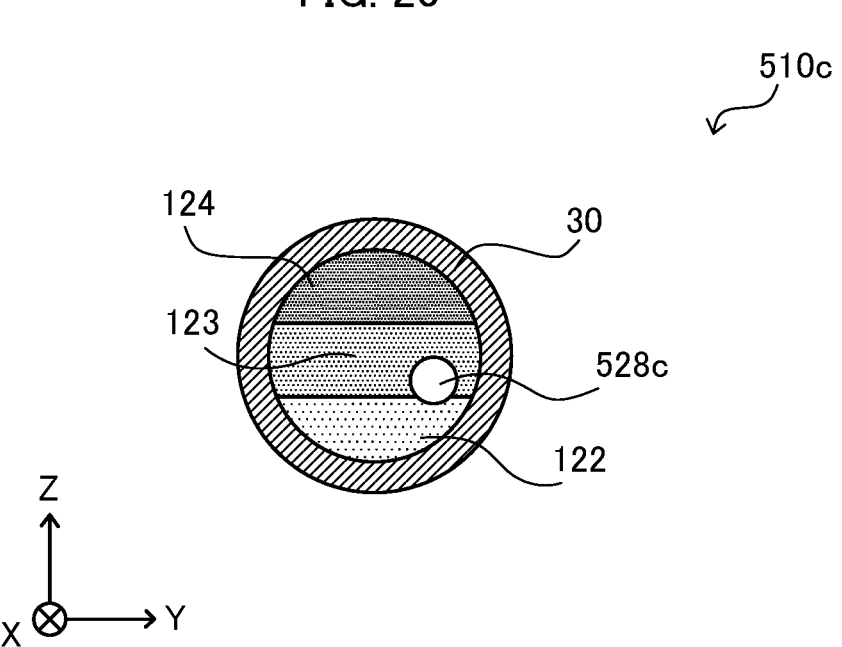
FIG. 20 is a cross-sectional view schematically illustrating a vascular lesion model according to a modification of the sixth embodiment.
Figure 21:
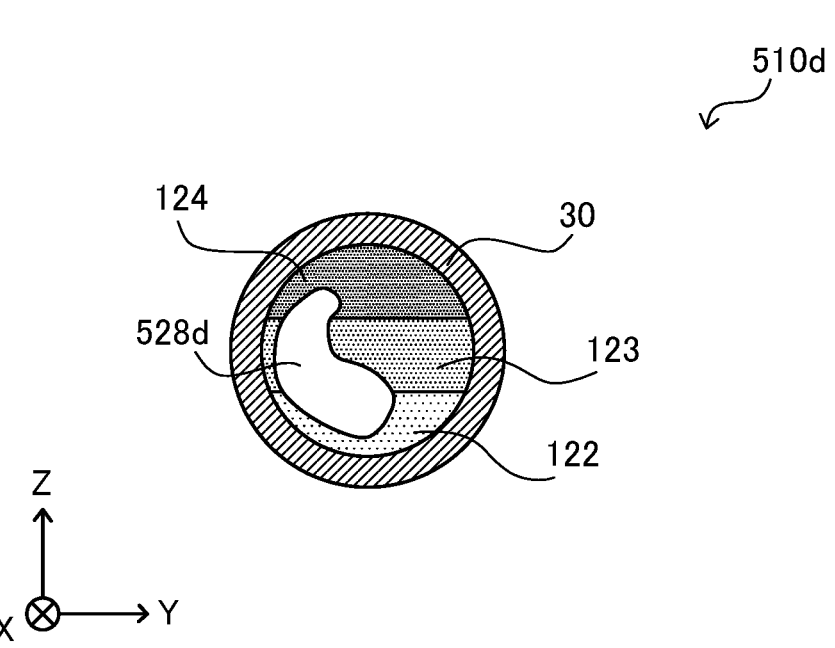
FIG. 21 is a cross-sectional view schematically illustrating a vascular lesion model according to a modification of the sixth embodiment.
Figure 22:
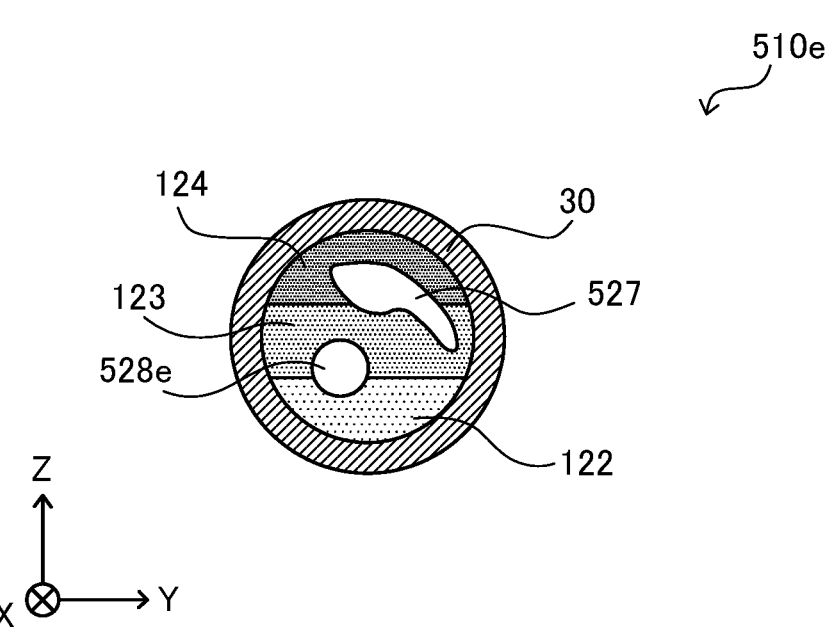
FIG. 22 is a cross-sectional view schematically illustrating a vascular lesion model according to a modification of the sixth embodiment.

FIGS. 18 to 22 are cross-sectional views schematically illustrating a state of cross sections perpendicular to a longitudinal direction of vascular lesion models 510a to 510e according to modifications of the sixth embodiment. The vascular lesion model 510a of a first modification of the sixth embodiment illustrated in FIG. 18 is provided with a through-hole 528a having an irregular outer peripheral shape in a cross section perpendicular to the longitudinal direction. In the vascular lesion model 510b of a second modification of the sixth embodiment illustrated in FIG. 19, the vascular lesion model 510c of a third modification of the sixth embodiment illustrated in FIG. 20, and the vascular lesion model 510d of a fourth modification of the sixth embodiment illustrated in FIG. 21, through-holes 528b, 528c, and 528d are respectively provided so that positions of the center of gravity deviate from the center of the cross section of the blood vessel portion 30 (are eccentric in the cross section inside the blood vessel portion 30) in a cross section of the vascular lesion models 510b, 510c, and 510d in the longitudinal direction. As illustrated in FIGS. 19 and 20, the size of the through-hole may vary. Further, as illustrated in FIG. 21, the through-hole may be formed eccentrically and in an irregular shape in a cross section perpendicular to the longitudinal direction of the vascular lesion model. The vascular lesion model 510e of a fifth modification of the sixth embodiment illustrated in FIG. 22 includes a plurality of through-holes 528e and 527 provided eccentrically in a cross section perpendicular to the longitudinal direction of the vascular lesion model 510e.

To manufacture the vascular lesion models including the through-holes described above, a rod-shaped core material having a shape corresponding to the through-hole may be placed inside the blood vessel portion 30, and then, the lesion portion is formed in the blood vessel portion 30. For example, the above-described core material can be made of metal, because metal has the rigidity to hold a position for forming a space that forms the through-hole in the blood vessel portion 30. Subsequently, a polymer material for forming a lesion region is placed or filled in a space between the inner wall of the blood vessel portion 30 and the above-described core material, and the polymer material is cured, or a lesion region prepared in advance may be placed in the space to form the lesion portion. After forming each lesion region, the core material may be removed from the lesion portion in the blood vessel portion 30. Further, to facilitate the removal of the core material, it is also desirable to apply a surface treatment to the core material to improve the releasability. Alternatively, after forming each lesion region in the blood vessel portion 30 without arranging the core material, a tubular punching member having a cross-sectional shape corresponding to the desired through-hole may be inserted at a desired position of the lesion portion in the longitudinal direction to form the space for forming the through-hole in the lesion portion.

FIGS. 18 to 22 illustrate a state where a through-hole is further provided in the vascular lesion model of the second embodiment. However, a similar configuration in which a through-hole is provided may be applied to a lesion portion of a different aspect, such as another embodiment other than the second embodiment.

According to such a configuration, the lesion portion includes a through-hole, so that it is possible to create a vascular lesion model that is constricted by the lesion portion, and provide more variations of vascular lesion models as vascular lesion models corresponding to various clinical cases. Here, it can be said that the through-holes illustrated in FIGS. 18 to 21 imitate the true lumen formed inside the intima of a blood vessel. On the other hand, the plurality of through-holes 528e and 527 are formed in the vascular lesion model 510e illustrated in FIG. 22 and it can be said that one through-hole simulates a false lumen formed outside the intima of the blood vessel. Thus, by providing a plurality of through-holes, both the true lumen and the false lumen can be simulated, so that it is possible to provide more variations of vascular lesion models that are similar to the aspects of lesions that are relatively frequently observed in clinical practice.

G. Seventh Embodiment

In a seventh embodiment, designable aspects of the end portions of the lesion portion included in the vascular lesion model will be described in detail. Below, a configuration will be described in which an aspect of an end portion of a lesion portion similar to that of the first embodiment is changed.

Figure 23:
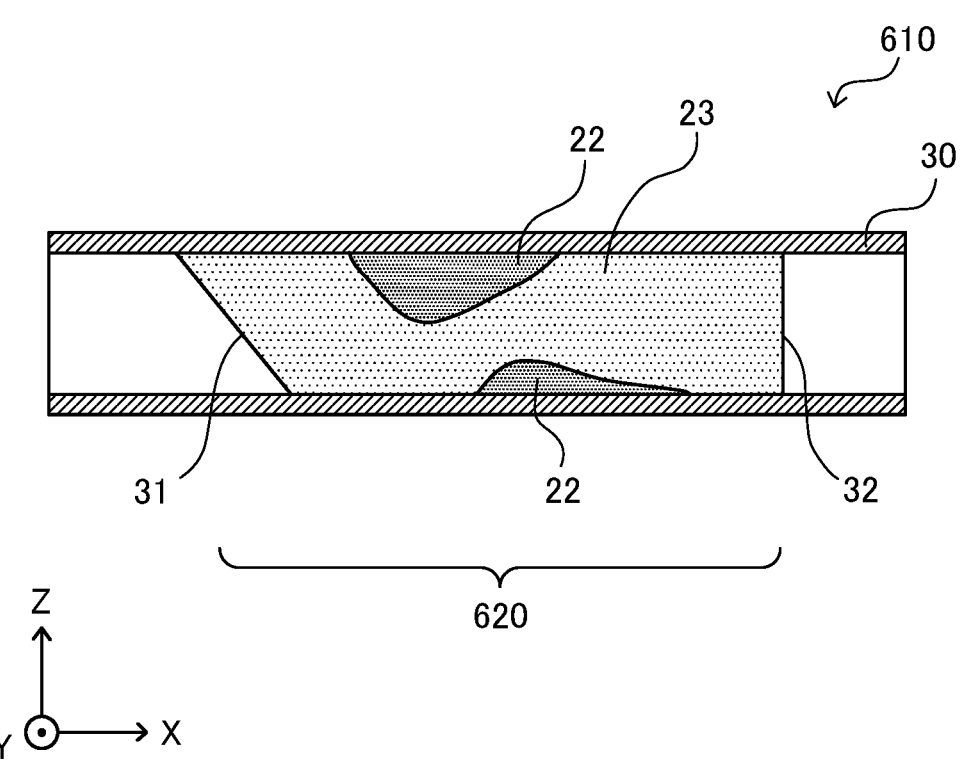
FIG. 23 is a cross-sectional view schematically illustrating a vascular lesion model according to a seventh embodiment.

Similarly to FIG. 1, FIG. 23 is a cross-sectional view schematically illustrating a state of a cross section parallel to a longitudinal direction of a vascular lesion model 610 according to a seventh embodiment. In a lesion portion 620 included in the vascular lesion model 610 of the seventh embodiment, a surface 31 at an end portion on a −X direction side has a tapered shape that is inclined with respect to a height direction (Z-axis direction) of the vascular lesion model 610, and a surface 32 at an end portion on a +X direction side is formed perpendicular to the longitudinal direction.

Figure 24:
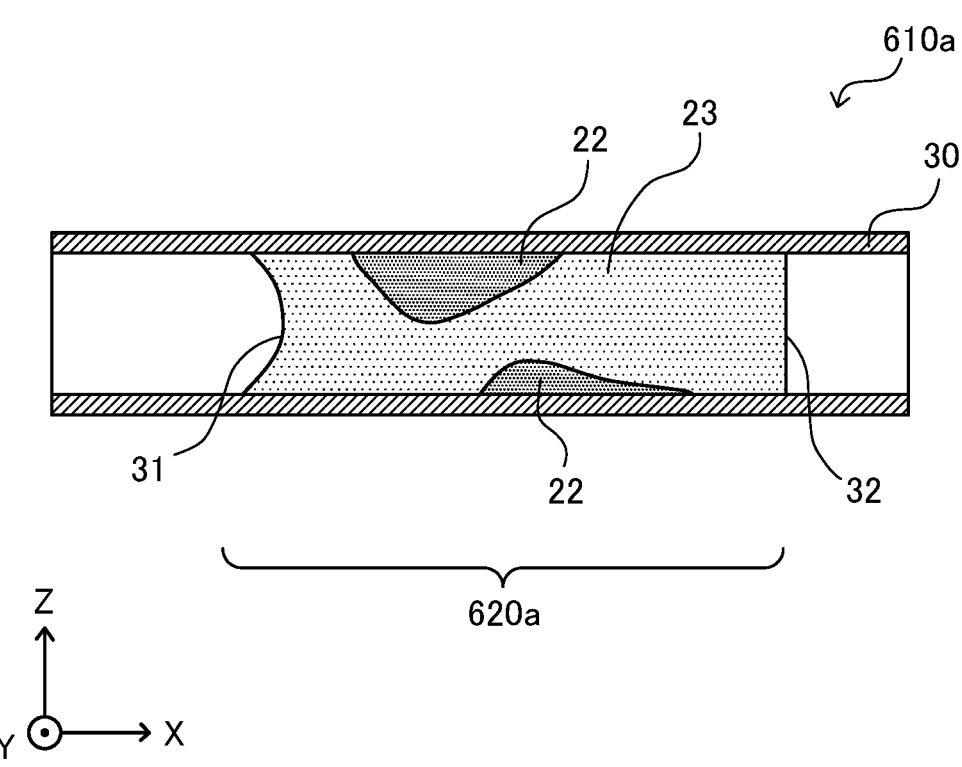
FIG. 24 is a cross-sectional view schematically illustrating a vascular lesion model according to a modification of the seventh embodiment.
Figure 25:
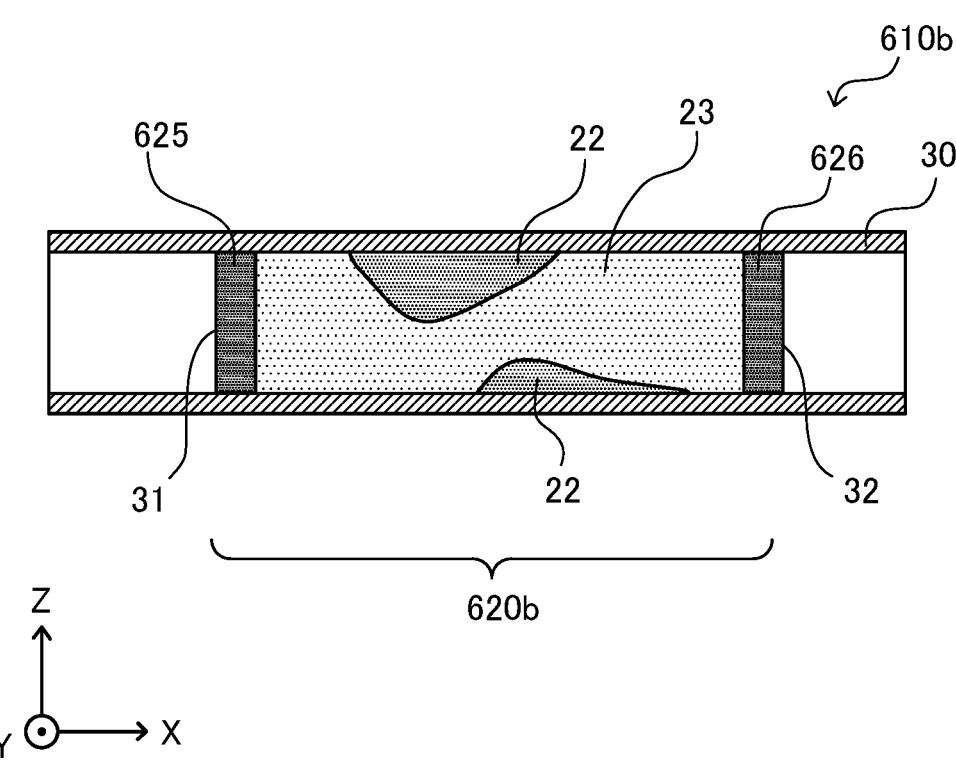
FIG. 25 is a cross-sectional view schematically illustrating a vascular lesion model according to a modification of the seventh embodiment.
Figure 26:
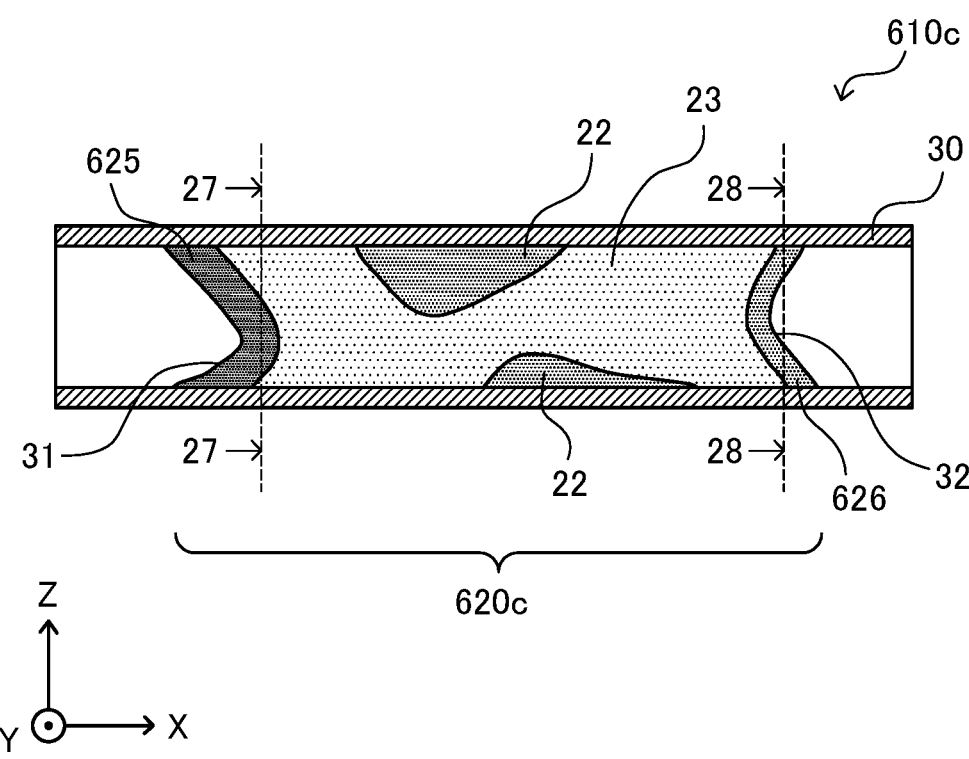
FIG. 26 is a cross-sectional view schematically illustrating a vascular lesion model according to a modification of the seventh embodiment.
Figure 27:
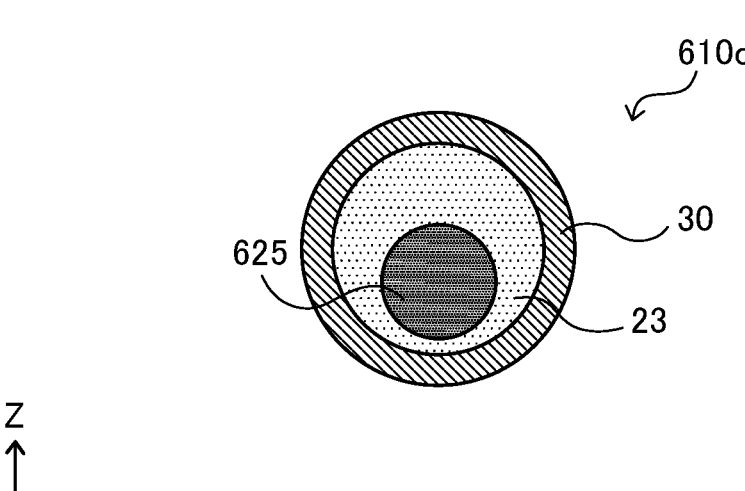
FIG. 27 is a cross-sectional view schematically illustrating a vascular lesion model according to a modification of the seventh embodiment.
Figure 28:
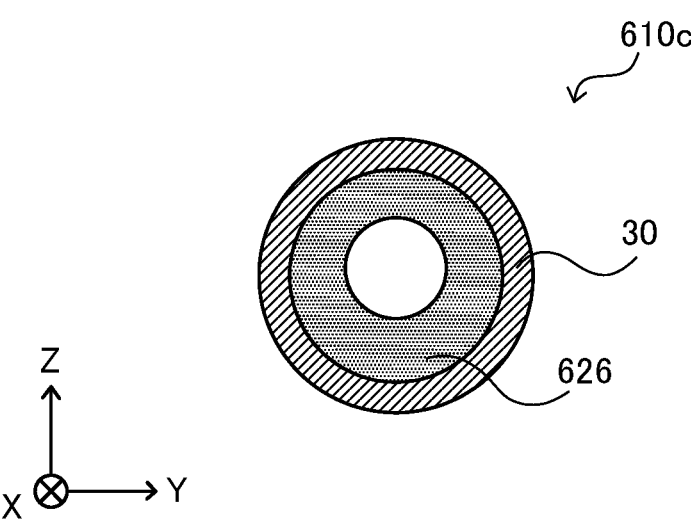
FIG. 28 is a cross-sectional view schematically illustrating a vascular lesion model according to a modification of the seventh embodiment.

FIGS. 24 to 26 are cross-sectional views schematically illustrating a state of cross sections parallel to a longitudinal direction of vascular lesion models 610a to 610c as modifications of the seventh embodiment. FIGS. 27 and 28 are cross-sectional views schematically illustrating a state of cross sections perpendicular to the longitudinal direction of the vascular lesion model 610c illustrated in FIG. 26. In FIG. 26, a position of the cross section of FIG. 27 is illustrated as a cross section 27-27, and a position of the cross section of FIG. 28 is illustrated as a cross section 28-28.

The vascular lesion model 610a of a first modification of the seventh embodiment illustrated in FIG. 24 differs from the vascular lesion model 610 in that the surface 31 of the end portion on the −X direction side of the lesion portion 620a is a concave surface. In a lesion portion 620b of the vascular lesion model 610b of a second modification of the seventh embodiment illustrated in FIG. 25, the surfaces 31 and 32 at both end portions in the longitudinal direction are formed perpendicular to the longitudinal direction, and at sections including these surfaces 31 and 32, end portion lesion regions 625 and 626 are provided that occlude the blood vessel portion 30 and are formed harder than the interposed lesion region 23. In a lesion portion 620c of the vascular lesion model 610c of a third modification of the seventh embodiment illustrated in FIG. 26, the surfaces 31 and 32 at the end portions are both formed as concave surfaces, and at sections including these surfaces 31 and 32, the end portion lesion regions 625 and 626 are provided that occlude the blood vessel portion 30 and are formed harder than the interposed lesion region 23. In the vascular lesion model 610c, the end portion lesion region 625 is formed harder than the end portion lesion region 626.

To obtain the end portions of the lesion portion in the shape described above, for example, in step T130, when the polymer material for forming the interposed lesion region 23 is filled into the blood vessel portion 30, end portions of the polymer material filled into the blood vessel portion 30 may be occluded with a member having an inverted shape relative to the desired shape of the end portions.

FIGS. 23 to 28 illustrate a state where the shape of the end portions of the lesion portion is changed in the vascular lesion model of the first embodiment. However, a similar configuration in which the shape of the end portions of the lesion portion is changed may be applied to a lesion portion of a different aspect, such as another embodiment different from the first embodiment.

According to the seventh embodiment, by variously changing the shape of both end portions of the lesion portion, or by further providing an end portion lesion region and combining these changes, it is possible to provide more variations of vascular lesion models as vascular lesion models corresponding to various clinical cases. For example, as described for the vascular lesion model 610b in FIG. 25 and the vascular lesion model 610c in FIG. 26, if the end portion lesion regions 625 and 626 that are harder than other regions such as the interposed lesion region 23 are provided, it is possible to simulate tissue at an end portion of a lesion portion (for example, a lump of plaque lesions, a calcified lesion, and the like) that are relatively frequently observed in clinical practice.

H. Eighth Embodiment

Figure 29:
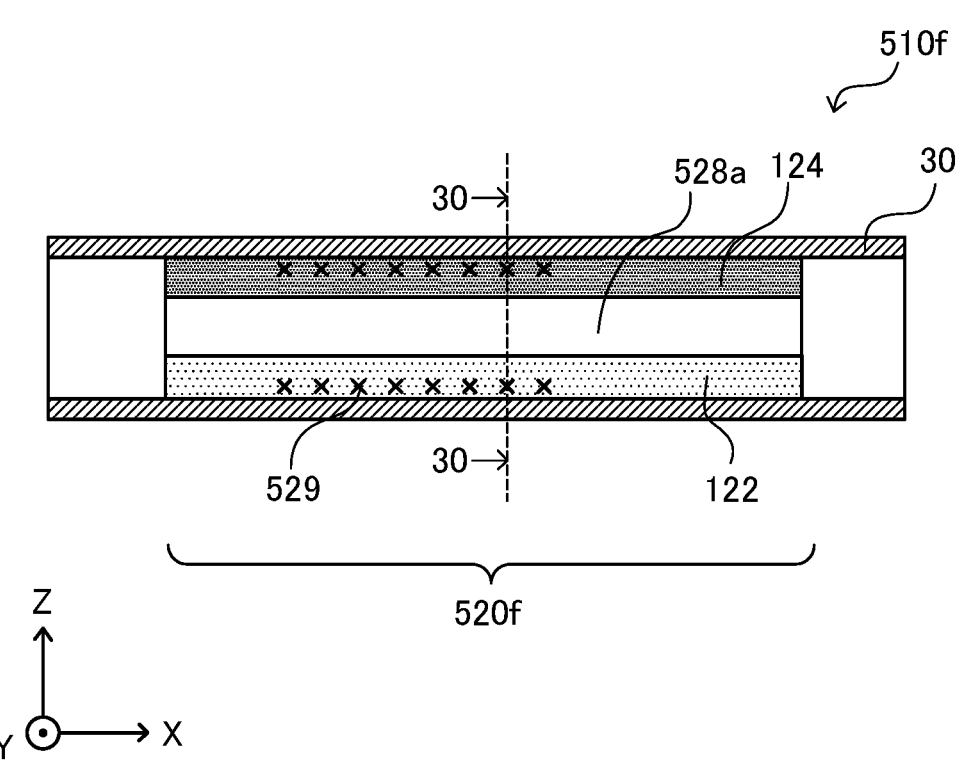
FIG. 29 is a cross-sectional view schematically illustrating an overall configuration of a vascular lesion model according to an eighth embodiment.
Figure 30:
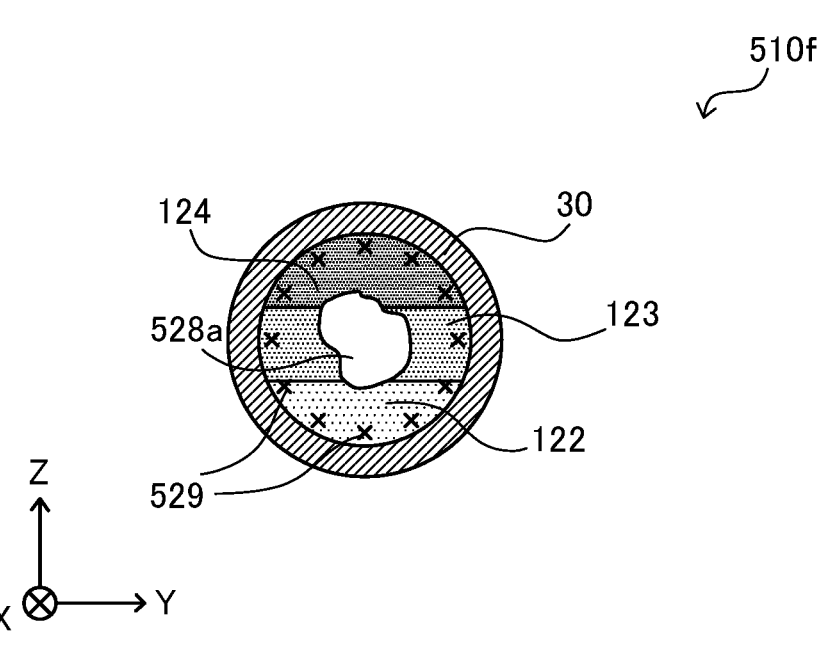
FIG. 30 is a cross-sectional view schematically illustrating a state of a cross section perpendicular to a longitudinal direction of the vascular lesion model.

FIG. 29 is a cross-sectional view schematically illustrating, similarly to FIG. 1, an overall configuration of a vascular lesion model 510f according to an eighth embodiment. FIG. 30 is a cross-sectional view schematically illustrating a state of a cross section perpendicular to a longitudinal direction of the vascular lesion model 510f. In FIG. 29, a position of the cross section of FIG. 30 is illustrated as a cross section 30-30.

The vascular lesion model 510f of the eighth embodiment includes a lesion portion 520f that is a lesion portion similar to that of the vascular lesion model 510a of the first modification of the sixth embodiment illustrated in FIG. 18 and further includes an intravascular indwelling device 529, which is a member imitating an intravascular indwelling device to be indwelled and used in a blood vessel. For example, the intravascular indwelling device 529 may be a stent, but may include other types of intravascular indwelling devices. To form the lesion portion 520f including the intravascular indwelling device 529, for example, it is only required to place the intravascular indwelling device 529 in the blood vessel portion 30, and then, place a polymer material for forming each lesion region in the blood vessel portion 30 and cure the polymer material.

FIGS. 29 and 30 illustrate a state where the intravascular indwelling device 529 is arranged in the vascular lesion model 510a of the first modification of the sixth embodiment. However, a similar configuration for arranging the intravascular indwelling device 529 may be applied to a lesion portion of another aspect, such as another embodiment and another modification different from the first modification of the sixth embodiment.

According to such a configuration, if the lesion portion includes the intravascular indwelling device 529, it is possible to simulate a lesion portion where restenosis or reocclusion occur after a treatment for indwelling the intravascular indwelling device 529. Thus, it is possible to provide more variations of vascular lesion models as vascular lesion models corresponding to various clinical cases.

I. Ninth Embodiment

In the first to eighth embodiments, the lesion portion includes only at least one type of lesion region among the first lesion region to the fourth lesion region in addition to the interposed lesion region 23, but the lesion portion may further include a lesion region of another type.

Figure 31:
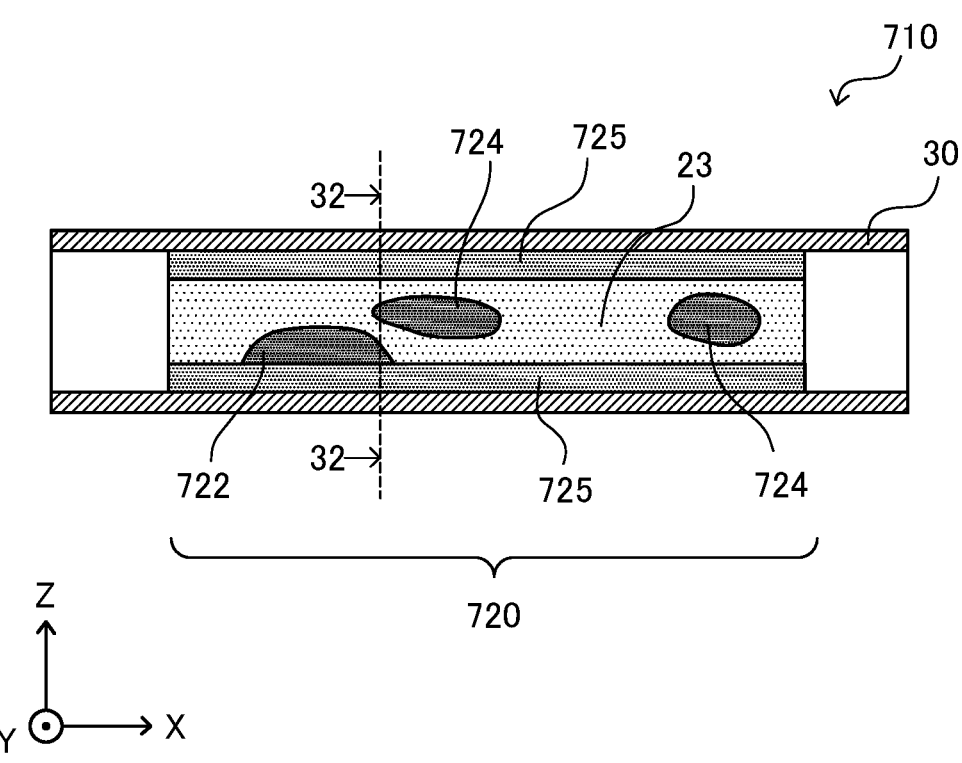
FIG. 31 is a cross-sectional view schematically illustrating an overall configuration of a vascular lesion model according to a ninth embodiment.
Figure 32:
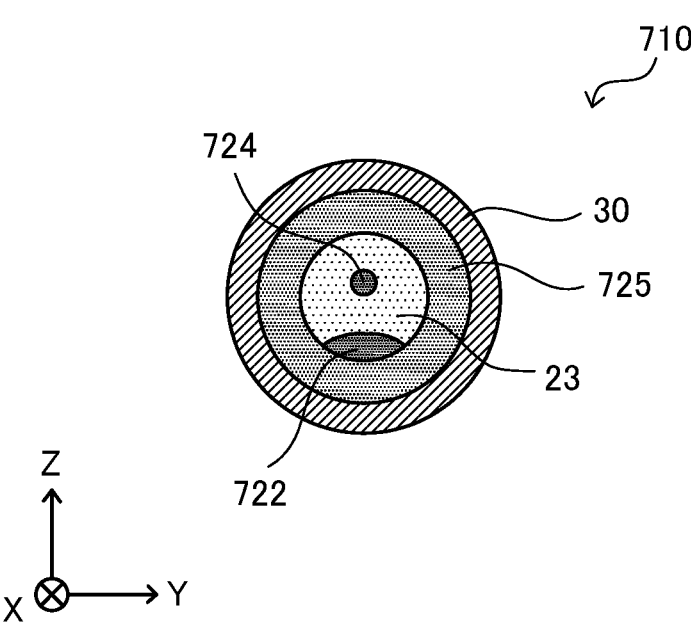
FIG. 32 is a cross-sectional view schematically illustrating a state of a cross section perpendicular to a longitudinal direction of the vascular lesion model.

FIG. 31 is a cross-sectional view schematically illustrating, similarly to FIG. 1, an overall configuration of a vascular lesion model 710 as a ninth embodiment. FIG. 32 is a cross-sectional view schematically illustrating a state of a cross section perpendicular to a longitudinal direction of the vascular lesion model 710. In FIG. 31, a position of the cross section of FIG. 32 is illustrated as a cross section 32-32.

The vascular lesion model 710 of the ninth embodiment includes a lesion portion 720 that simulates a lesion formed in a blood vessel, and the blood vessel portion 30 that is similar to that of the first embodiment. The lesion portion 720 includes one protruding lesion region 722, two floating lesion regions 724, a tubular lesion region 725, and the interposed lesion region 23 forming a region other than these lesion regions. The number of the protruding lesion regions 722 and the floating lesion regions 724 may be different from the numbers mentioned above, for example, one or more.

In the lesion portion 720 of the ninth embodiment, the tubular lesion region 725 is formed in a hollow cylindrical shape including the entire side surface of the lesion portion 720 extending in the longitudinal direction, and does not correspond to any of the first lesion region to the fourth lesion region. The two floating lesion regions 724 each have a solid shape separated from the outer periphery of the lesion portion 720 in both a cross section perpendicular to the longitudinal direction and a cross section parallel to the longitudinal direction, and correspond to the "second lesion regions", similarly to the floating lesion regions 228 and 229 of the third embodiment. In a cross section perpendicular to the longitudinal direction, the protruding lesion region 722 is arranged to contact a part of an inner periphery of the tubular lesion region 725 and has a shape that extends from the part of the inner periphery of the tubular lesion region 725 toward a center of the lesion portion 720. As illustrated in FIG. 31, the protruding lesion region 722 is arranged separated from both ends of the lesion portion 720 in the longitudinal direction. The protruding lesion region 722 having such a configuration also has a solid shape separated from the outer periphery of the lesion portion 720 in both a cross section perpendicular to the longitudinal direction and a cross section parallel to the longitudinal direction, and thus, corresponds to the "second lesion region".

In FIGS. 31 and 32, a darker hatching of a lesion region indicates that the lesion region is harder. However, the combination of hardness in the lesion regions can be variously changed. Each lesion region included in the lesion portion 720 of the ninth embodiment may be formed by using one or a plurality of polymer materials selected from various polymer materials similar to those of the protruding lesion regions 22 and the interposed lesion region 23 of the first embodiment. Each of the lesion regions included in the lesion portion 720 of the ninth embodiment may further contain an inorganic material, in addition to the polymer material. Further, at least a part of the lesion regions included in the lesion portion 720 of the ninth embodiment may be formed by using a porous polymer body, as described in the first embodiment.

Thus, even if the lesion portion of a vascular lesion model further includes a lesion region of another type, in addition to at least one type of lesion region among the first lesion region to the fourth lesion region, similarly to the embodiments described above, it is possible to provide, as a vascular lesion model corresponding to various clinical cases, variations of vascular lesion models that are different from conventional models. A lesion region having various shapes other than the hollow cylindrical shape may be employed as the lesion region of another type combined with the at least one type of lesion region among the first lesion region to the fourth lesion region. The lesion region of another type described above may be configured by using a polymer material, or may be configured by using, for example, an inorganic material or a metal material without using a polymer material.

The present disclosure is not limited to the above-described embodiments, and can be realized with various configurations without departing from the spirit of the present disclosure. For example, the technical features in the embodiments corresponding to the technical features in each of the aspects described in the SUMMARY may be appropriately replaced or combined to solve some or all of the problems described above, or to achieve some or all of the effects described above. Further, unless a technical feature is described as essential in the present specification, it may be omitted as appropriate.

What is claimed is:

1. A vascular lesion model, comprising:
a blood vessel portion having a hollow shape and configured to simulate a blood vessel; and
a lesion portion arranged inside the blood vessel portion and divided into a plurality of lesion regions each having a different hardness, at least a part of lesion regions among the plurality of lesion regions being formed from a polymer material,
wherein the lesion portion includes, as the at least the part of the lesion regions, at least one type of lesion region selected from the group consisting of:
a first lesion region arranged to contact a part of an inner periphery of the blood vessel portion in a cross section perpendicular to a longitudinal direction of the vascular lesion model and having a shape that extends from the part of the inner periphery toward a center of the lesion portion,
a second lesion region having a solid shape separated from an outer periphery of the lesion portion in both a cross section perpendicular to the longitudinal direction and a cross section parallel to the longitudinal direction,
a third lesion region arranged separated from both ends of the lesion portion in the longitudinal direction and configured to occlude the blood vessel portion, and
a plurality of fourth lesion regions provided separated from the inner periphery of the blood vessel portion in a cross section perpendicular to the longitudinal direction, and arranged independently and separately from one another,
wherein the lesion portion includes the third lesion region, and
the third lesion region has a hardness that is harder than a hardness of a lesion region arranged adjacent to the third lesion region in the lesion portion.

2. The vascular lesion model according to claim 1, wherein the lesion portion includes the first lesion region, and
the first lesion region has a hardness that is harder than a hardness of a lesion region contacting the first lesion region.

3. The vascular lesion model according to claim 2, wherein in a cross section perpendicular to the longitudinal direction, the plurality of the lesion regions include the first lesion region defined by at least two layers, the at least two layers being separated by a line connecting two points on the inner periphery of the blood vessel portion.

4. The vascular lesion model according to claim 3, wherein at least a part of lesion regions among the plurality of lesion regions includes an inorganic material.

5. The vascular lesion model according to claim 3, wherein a part of the plurality of lesion regions in the lesion portion includes a porous polymer material.

6. The vascular lesion model according to claim 2, wherein at least a part of lesion regions among the plurality of lesion regions includes an inorganic material.

7. The vascular lesion model according to claim 2, wherein a part of the plurality of lesion regions in the lesion portion includes a porous polymer material.

8. The vascular lesion model according to claim 1, wherein in a cross section perpendicular to the longitudinal direction, the plurality of the lesion regions include the first lesion region defined by at least two layers, the at least two layers being separated by a line connecting two points on the inner periphery of the blood vessel portion.

9. The vascular lesion model according to claim 1, wherein the lesion portion includes the second lesion region, and
the second lesion region has a hardness at a section including a surface of the second lesion region that is different than a hardness of another section of the second lesion region.

10. The vascular lesion model according to claim 9, wherein at least a part of lesion regions among the plurality of lesion regions includes an inorganic material.

11. The vascular lesion model according to claim 9, wherein a part of the plurality of lesion regions in the lesion portion includes a porous polymer material.

12. The vascular lesion model according to claim 1, wherein the lesion portion includes the plurality of fourth lesion regions, and
a part of the plurality of fourth lesion regions has a hardness that is harder than a hardness of another part of the fourth lesion regions.

13. The vascular lesion model according to claim 1, wherein at least a part of lesion regions among the plurality of lesion regions includes an inorganic material.

14. The vascular lesion model according to claim 1, wherein a part of the plurality of lesion regions in the lesion portion includes a porous polymer material.

15. The vascular lesion model according to claim 1, wherein the lesion portion includes a plurality of through-holes penetrating the lesion portion in the longitudinal direction.

16. The vascular lesion model according to claim 1, further comprising a member configured to imitate an intravascular indwelling device that is indwelled and to be used in a blood vessel in the lesion portion.

* * * * *